United States Patent
Ziv

(10) Patent No.: US 9,966,779 B2
(45) Date of Patent: May 8, 2018

(54) METHOD AND APPARATUS FOR CONTROLLING A LOAD

(71) Applicant: SWITCHBEE LTD., Natanya (IL)

(72) Inventor: Amichai Ziv, Natanya (IL)

(73) Assignee: SWITCHBEE LTD., Natanya (IL)

( * ) Notice: Subject to any disclaimer, the term of this patent is extended or adjusted under 35 U.S.C. 154(b) by 0 days. days.

(21) Appl. No.: 15/511,315

(22) PCT Filed: Sep. 20, 2015

(86) PCT No.: PCT/IL2015/050946
§ 371 (c)(1),
(2) Date: Mar. 15, 2017

(87) PCT Pub. No.: WO2016/046814
PCT Pub. Date: Mar. 31, 2016

(65) Prior Publication Data
US 2017/0271904 A1    Sep. 21, 2017

Related U.S. Application Data

(60) Provisional application No. 62/054,019, filed on Sep. 23, 2014.

(51) Int. Cl.
*H02J 3/00*    (2006.01)
*H02J 7/00*    (2006.01)
(Continued)

(52) U.S. Cl.
CPC .............. *H02J 7/0068* (2013.01); *H02J 3/00* (2013.01); *H02J 7/02* (2013.01); *H05B 37/0272* (2013.01);
(Continued)

(58) Field of Classification Search
CPC ....................................................... H02J 3/00
(Continued)

(56) References Cited

U.S. PATENT DOCUMENTS 4,429,339 A * 1/1984 Jaeschke ............ H03K 17/0822
330/207 P
5,689,230 A * 11/1997 Merwin .............. H04L 12/2803
307/38
(Continued)

FOREIGN PATENT DOCUMENTS

WO    2009027962    3/2009
WO    2012083380    6/2012
(Continued)

OTHER PUBLICATIONS

Cisco Validated Design document entitled: "Building Automation System over IP (BAS/IP) Design and Implementation Guide" by Cisco Systems and Johnson Controls, Aug. 15, 2008 (107 pages).
(Continued)

*Primary Examiner* — Adi Amrany
(74) *Attorney, Agent, or Firm* — May Patents Ltd. c/o Dorit Shem-Tov

(57) ABSTRACT

A method and apparatus for switching AC power to a lamp (or other load) via a two terminal switch device. The switch device comprises a first electrically controlled switch, such as a triac or relay, and a second electrically controlled resistance or switch connected in series to the first switch. A diode is connected in parallel to the second switch. When the first switch is open, only a leakage current is flowing through the switch device, supplied to an AC/DC converter for producing a low DC voltage to the switch device logic and other low-voltage circuits and for charging a capacitor. When the first switch is closed, the second switch is controlled to be conductive for allowing powering the lamp from the AC power. During part of a positive half-cycle of the AC voltage, a closed loop regulates a DC voltage over the second switch terminals for providing a low DC voltage for charging a capacitor. At least during a negative half-cycle
(Continued)

of the AC voltage, the low DC voltage is provided from the capacitor.

37 Claims, 17 Drawing Sheets

(51) Int. Cl.
*H05B 37/02* (2006.01)
*H02J 7/02* (2016.01)
*H02J 7/34* (2006.01)
*H04W 84/12* (2009.01)
*H04W 4/00* (2018.01)

(52) U.S. Cl.
CPC .............. *H02J 7/345* (2013.01); *H04W 4/008* (2013.01); *H04W 84/12* (2013.01)

(58) Field of Classification Search
USPC .......................................... 307/112, 115, 125
See application file for complete search history.

(56) References Cited

U.S. PATENT DOCUMENTS

| | | | | |
|---|---|---|---|---|
| 5,932,934 | A * | 8/1999 | Hofstetter | H02M 3/158 307/26 |
| 6,424,156 | B1 | 7/2002 | Okamura | |
| 6,867,558 | B2 | 3/2005 | Gaus, Jr. et al. | |
| 6,967,565 | B2 | 11/2005 | Lingemann | |
| 7,129,850 | B1 | 10/2006 | Shih | |
| 7,164,238 | B2 * | 1/2007 | Kazanov | H05B 37/0227 315/209 R |
| 7,830,041 | B2 * | 11/2010 | Yang | H01R 13/6658 307/115 |
| 7,944,086 | B2 * | 5/2011 | Hodges | H02H 3/12 307/126 |
| 7,961,111 | B2 * | 6/2011 | Tinaphong | H02H 9/042 340/638 |
| 8,471,687 | B2 | 6/2013 | Steiner et al. | |
| 8,531,061 | B2 * | 9/2013 | Lim | H01R 13/655 307/125 |
| 8,817,430 | B2 * | 8/2014 | Simon | H02M 5/293 361/18 |
| 9,013,283 | B1 * | 4/2015 | Tackaberry | G06Q 10/08 340/12.22 |
| 9,185,753 | B2 * | 11/2015 | Igaki | H05B 33/0803 |
| 9,220,410 | B2 * | 12/2015 | Sheynblat | G01C 21/16 |
| 2002/0011923 | A1 | 1/2002 | Cunningham et al. | |
| 2002/0185916 | A1 * | 12/2002 | Barton | G06F 1/266 307/38 |
| 2004/0207342 | A1 * | 10/2004 | Novikov | H05B 39/086 315/312 |
| 2007/0176788 | A1 | 8/2007 | Mor et al. | |
| 2008/0164768 | A1 * | 7/2008 | Litwack | H05B 37/0281 307/116 |
| 2008/0309164 | A1 * | 12/2008 | Lim | H01R 13/6641 307/39 |
| 2009/0103223 | A1 * | 4/2009 | Prussmeier | H03K 17/0822 361/93.9 |
| 2010/0277306 | A1 | 4/2010 | Leinen et al. | |
| 2010/0151919 | A1 * | 6/2010 | Caskey | H04W 52/0274 455/574 |
| 2010/0292050 | A1 * | 11/2010 | Dibenedetto | A63B 24/0062 482/9 |
| 2011/0185196 | A1 * | 7/2011 | Asano | B60L 11/1809 713/300 |
| 2011/0193495 | A1 | 8/2011 | Mishima et al. | |
| 2011/0279053 | A1 | 11/2011 | Briggs | |
| 2012/0044350 | A1 | 2/2012 | Verfuerth | |
| 2012/0161548 | A1 * | 6/2012 | Han | G08C 17/02 307/126 |
| 2013/0275530 | A1 * | 10/2013 | Matson | H04L 51/24 709/206 |
| 2014/0125230 | A1 | 5/2014 | Shteynberg et al. | |
| 2014/0167912 | A1 | 6/2014 | Snyder et al. | |
| 2014/0229644 | A1 * | 8/2014 | Thanigasalam | G06F 13/24 710/110 |
| 2015/0019892 | A1 * | 1/2015 | Agrawal | G06F 1/32 713/323 |
| 2015/0121108 | A1 * | 4/2015 | Agrawal | G06F 1/3206 713/323 |
| 2015/0172848 | A1 * | 6/2015 | Gao | H04W 4/008 455/41.3 |
| 2015/0287256 | A1 * | 10/2015 | Davis | G05B 19/02 340/5.25 |
| 2016/0295511 | A1 * | 10/2016 | Qi | H04L 67/104 |

FOREIGN PATENT DOCUMENTS

| | | |
|---|---|---|
| WO | 2014076695 | 5/2014 |
| WO | 2014076697 | 5/2014 |

OTHER PUBLICATIONS

Product Specifications from Philips Semiconductors "TrenchMOS™ transistor Standard level FET BUK7524-55" Rev 1.000 dated Jan. 1997 (8 pages).
Chapter 20: "Wireless Technologies" of the publication No. 1-587005-001-3 by Cisco Systems, Inc. (7/99) entitled: "Internetworking Technologies Handbook" (42 pages).
Data Sheet "BTA06 T/D/S/A BTB06 T/D/S/A—Sensitive Gate Triacs", published by SGS-Thomson Microelectronics Mar. 1995 (5 pages).
William Stallings, "Wireless Communications and Networks", Second Edition, 2005, 2002 Pearson Education Inc. (150 pages).
International Search Report of PCT/IL2015/050946 dated Mar. 11, 2016.
Written Opinion of PCT/IL2015/050946 dated Mar. 11, 2016.
International Preliminary Report on Patentability (IPRP) of PCT/IL2015/050946 dated Mar. 2, 2017.

* cited by examiner

METHOD AND APPARATUS FOR CONTROLLING A LOAD

TECHNICAL FIELD

This disclosure relates generally to an apparatus and method for controlling the power supplied to a load from a power source, and for being powered from the supplied power, and in particular to a two-terminal switch connected serially between the power source and the load, such as remotely-controlled two-terminal light control switch powered from the AC mains.

BACKGROUND

Unless otherwise indicated herein, the materials described in this section are not prior art to the claims in this application and are not admitted to be prior art by inclusion in this section. FIG. 1 shows an electrical diagram 10 of a typical arrangement of light control in a building, such as in a domestic, commercial, or industrial environment. An AC power source 11 may be the mains grid, providing Alternating-Current (AC) (a.k.a. Line power, AC power, grid power, and household electricity). The AC power source 11 supplies 120 VAC/60 Hz in North America (or 115 VAC) and 230 VAC/50 Hz (or 220 VAC) in most of Europe. The AC power typically consists of a sine wave (or sinusoid) waveform, where the voltage relates to an RMS amplitude value (120 or 230), and having a frequency measured in Hertz, relating to the number of cycles (or oscillations) per second. Commonly single-phase infrastructure exists, and a wiring in the building commonly uses three wires, known as a line wire (also known as phase, hot, or active) that carry the alternating current, a neutral wire (also known as zero or return) which completes the electrical circuit by providing a return current path, and an earth or ground wire, typically connected to the chassis of any AC-powered equipment, that serves as a safety means against electric shocks. As illustrated in the circuit diagram 10 shown in FIG. 1, a phase line 14b is connected to a lamp 12, serving as a load. The lamp 12 connects via a wire 14a to a lamp switch 13 that is commonly a Single-Pole, Single-Throw (SPST), which connects via a neutral wire 14c to the AC power source 11.

The light switch 13 is commonly a mechanically actuated switch 20 as depicted in FIG. 2, that is connected in series between the AC power 11 and the lamp 12, and is typically an on/off switch for turning the illumination of the lamp 12 'on' and 'off'. As shown in FIG. 2, the switch 13 may be wall-mounted into a standard wall cavity, commonly using a plastic light switch box. The switch in some scenarios is connected via two terminals designated as 15a and 15b, where the terminal 15b connects to the AC power 11 return via the wire 14c, while the terminal 15a connects to the load 12 via the wire 14a.

The building wiring lighting circuit 10 shown in FIG. 1 allows for a control in one location via the light switch 13. In some places such as in a hallway, stairwell, or a large room, it is more convenient to control the lamp 12 from two (or more) locations. FIG. 1a shows an arrangement of a wiring circuit 16 allowing the control of the lamp 12 from two locations, via two separated switches 17a and 17b, known as multiway switching. The switches 17a and 17b are both Single-Pole, Double-Throw (SPDT) switches (a.k.a. two-way or three-way switches), each having three terminals. The light switch 17a comprises a single pole connected to a terminal 15c, and can be in one of two states, designated as '1' and '2'. In state '1' the switch 17a connects the terminal 15c to a terminal 15e, and in state '2' the switch 17a connects the terminal 15c to a terminal 15d. Similarly, the light switch 17b comprises a single pole connected to a terminal 15h, and can be in one of two states, designated as '1' and '2'. In state '1' the switch 17b connects the terminal 15h to a terminal 15f, and in state '2' the switch 17b connects the terminal 15h to the a terminal 15g. A wire 14d connects the terminal 15e of the light switch 17a to the terminal 15g of the light switch 17b, and a wire 14e connects the terminal 15d of the light switch 17a to terminal 15f of the light switch 17b. In the case where both switches 17a and 17b are in the same state '1' or '2', the circuit is open and no current flows to the lamp 12. In all other cases, where the switches are in different states, the circuit is closed hence allowing current to flow to the lamp 12. Thus the lamp 12 may be turned 'on' or 'off' from any one of the switches 17a and 17b.

Using the light switch 20 requires a person to physically approach and mechanically activate the switch. In one scenario, it is preferred to remotely turn the lights on or off, without physical access to the switch. Such remote lighting control may be used for building automation, or may be part of, integrated with, or coupled to a building automation system, such as a building automation system described in U.S. Pat. No. 6,967,565 to Lingemann entitled: "Building Automation System", which is incorporated in its entirety for all purposes as if fully set forth herein. Such system may further support, be part of, or be integrated with, a Building Automation System (BAS) standard, and may further be in part or in full in accordance with Cisco Validated Design document entitled: "Building Automation System over IP (BAS/IP) Design and Implementation Guide " by Cisco Systems and Johnson Controls, which is incorporated in its entirety for all purposes as if fully set forth herein.

A system for remotely controlling the operation of wall-mounted switches is disclosed in U.S. Patent Application No. 2007/0176788 to Mor, entitled: "Remote Control System for Controlling Wall-Mounted Switches ", which is incorporated in its entirety for all purposes as if fully set forth herein, describing a remote control system for controlling the operation of a wall-mounted switch that includes a remote control unit adapted to be located at a remote location with respect to the wall-mounted switch and having a depressible switch button. Further, a light control system for two-wire installations is disclosed in U.S. Pat. No. 8,471,687 to Steiner et al., entitled: "Method and Apparatus for Communication Message Signals in a Load Control System ", which is incorporated in its entirety for all purposes as if fully set forth herein, describing a system for independent control of electric motors and electric lights where a plurality of two-wire installations are coupled in series via power wires between AC source and a light/motor control unit. Similarly, PCT International Publication No. WO 2009/027962 to Ziv, entitled: "Remote Controlled Electrical Switch Retrofit System ", which is incorporated in its entirety for all purposes as if fully set forth herein, describes a wall mounted power switch retrofit. The retrofit includes a switch that connects to the existing wires of the retrofitted wall mounted power switch, and allows power to be provided to a load when turned on and prevents power from being provided to the load when turned off, a control unit that controls the status of the switch, a circuit that draws power from the existing wires and provides it to the control unit; and wherein the control unit receives electrical power regardless of the status of the switch.

An automatically actuatable switch device is disclosed in U.S. Pat. No. 7,129,850 to Shih entitled: "Automatically Actuatable Switch Device ", which is incorporated in its entirety for all purposes as if fully set forth herein, describing a switch device that includes a housing, where a circuit board is disposed in the housing for being coupled between an electric power source and an electric appliance, and a remote detecting device that includes a light emitting and receiving device for generating lights to detect whether users are going towards the housing on the switch device or not. Similarly, U.S. Patent Application No. 2010/0277306 to Leinen entitled: "Wireless Occupancy Sensing with Accessible Location Power Switching ", which is incorporated in its entirety for all purposes as if fully set forth herein, describes a system that includes an accessible electrical box; a wireless receiver to receive a wireless signal from an occupancy sensor; a power switch to control power to a load; and a controller to control the power switch in response to the wireless signal. The wireless receiver, controller, and power switch are included in the accessible electrical box. Further, PCT International Publication No. WO 2014/076697 to Ziv entitled: "Device Kit and Method for Absorbing Leakage Current " which is incorporated in its entirety for all purposes as if fully set forth herein, describes a kit device, and method for absorbing leakage current in an electronic circuit including at least one switch and at least one load by using an absorbing device and an absorbing material or an absorbent marking device, wherein the absorbent marking device is configured to mark or attach an absorbing material on the circuit or on the load.

A storage capacitor power supply is disclosed in U.S. Pat. No. 6,424,156 to Okamura entitled: "Storage Capacitor Power Supply ", which is incorporated in its entirety for all purposes as if fully set forth herein, describing long-lived, lightweight, and quickly and precisely charged storage capacitor power supply capable of stably supplying electric power to a load, where the power supply has a capacitor block consisting of capacitors connected in series, in parallel or in any combination of series and parallel.

ZigBee is a standard for a suite of high level communication protocols using small, low-power digital radios based on an IEEE 802 standard for Personal Area Network (PAN). Applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at radio-frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus an average power consumption can be lower, resulting in longer battery life.

There are three defined types of ZigBee devices: ZigBee coordinator (ZC), which is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as can acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on, so as to reduce power use. In beaconing networks, nodes only need to be active while a beacon is being transmitted. In non-beacon-enabled networks, power consumption is decidedly asymmetrical: some devices are always active, while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA). That is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements may also use Guaranteed Time Slots (GTS), which by definition do not use CSMA.

Z-Wave is a wireless communications protocol by the Z-Wave Alliance (http://www.z-wave.com) designed for home automation, specifically for remote control applications in residential and light commercial environments. The technology uses a low-power RF radio embedded or retro-fitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms and security sensors.

Z-Wave is a mesh networking technology where each node or device on the network is capable of sending and receiving control commands through walls or floors and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); 921.42 MHz (Australia/New Zealand).

Z-Wave uses a source-routed mesh network topology and has one or more master controllers that control routing and security. The devices can communicate to another by using intermediate nodes to actively route around and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore a Z-Wave network can span much farther than the radio range of a single unit; however, with several of these hops a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, and in particular in WLAN networks.

A popular wireless technology is commonly referred to as Wireless Local Area Network (WLAN), such communication makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In consideration of the foregoing, it would be an advancement in the art to provide a method and systems supporting power control to a load, remotely control power to a load, an improved diagnostics and security, or monitoring proper operation, or detecting deterioration, that are simple, secure, cost-effective, reliable, easy to use or monitor, has a minimum part count, minimum hardware, and/or uses existing and available components, protocols, programs and applications for providing better control, monitoring, security, and additional functionalities, and provides a better user experience.

SUMMARY

A switching device is disclosed having two terminals that may be connected for switching AC power from AC power source (such as domestic/mains AC power 120 VAC/60 Hz or 230 VAC/50 Hz) to a lamp or another load. The switching device may substitute a common light switch in a building. The switching device includes a switch block connected between its terminals, having a controlled switch having on/off states (such as a relay or a triac) connected in series to a controlled resistance component that may be controlled by a control port, which may be based on an MOSFET transistor, where the gate port controls the Rds between the drain and source ports. The switching device may be in an 'on' state, where the controlled switch is 'on' and the resistance may be controlled to a low resistance, such as Rds(on) in an MOSFET example. The switching device may be in an 'off' state, where the controlled switch is 'off' or the resistance may be controlled to a high resistance, such as Rds(off) in an MOSFET example. The switching device may be locally or remotely activated, or both.

The electronic circuits of the switching device, such as the logic or control electronic circuits, may be DC powered from a DC power supply that may be part of the switching device and powered from the AC power source, and providing a low-voltage DC power. The DC power supply may be based on a capacitor supplying the DC voltage. During the switching device 'off' state, a low-power AC/DC converter uses a leakage current for powering the electronic circuits. During the switching device 'on' state, in part of the time, such as a part of the cycle of the AC power, the resistance of the controlled resistance component may be controlled to be high-resistance. Hence a DC voltage may be developing across the controlled resistance component, charging the capacitor. During another part of the time, such as the other part of the cycle of the AC power, the resistance of the controlled resistance component may be controlled to be low-resistance, and the DC power supply uses the energy stored in the capacitor to power the switching device circuits. The capacitor charging may be performed at the positive half-cycle of the AC power cycle (as measured at the terminals), detected by comparing the voltage across the controlled resistance component to be positive and lower than the voltage across the capacitor. When charged as designed, the controlled resistance component may be controlled to be in a low-resistance state until the beginning of the positive half-cycle. After charging the capacitor and reverting to low-resistance state, preferably during the negative half-cycle, the resistance of the controlled resistance component may be periodically controlled for a short-period to be high-resistance, when the voltage across the controlled resistance component may be measured, to verify when the negative half-cycle may be completed, and a positive half-cycle starts.

The switching device may include a control block, comprising a memory storing a software or firmware and a processor executing the software/firmware. The processor controls the switch block by controlling the controlled switch and the controlled resistance component. The control switch may comprise touch button for human activation of the switch (turning it 'on' or 'off'). The control block may further include a wireless transceiver, which may be Zigbee, Z-Wave, WLAN or proprietary based), for allowing the switching device to be remotely activated via a wireless network. Some of the functionalities or circuits of the switching device may be designated as low priority, and in the case the DC power supply block may not provide the required power for the switching device to be fully operational, the switching device shifts to 'low-power' mode, where the processor deactivates the low priority functionalities or disconnect the low priority circuits from the DC power, for example by using a relay or other controlled switch. For example, a backlight illumination may be reduced or eliminated, or a wireless transceiver transmitting power may be reduced.

The switch may be used as a substitute to a typical light switch. In one example, the switching device may be used in a multiway system, where the load may be switched from two distinct locations, such as two light switches. In such configuration, the two switches may be substituted with two multiway devices where each device may be based on, or consisting of, the switching device. The two multiway devices may be connected so that the two switching devices may be connected in parallel. One of the multiway devices further comprises a detecting a voltage sensing block for sensing the voltage developed on the switching device terminals. Such voltage-sensing block may comprise a diode bridge for rectifying the sensed voltage, a regulator for producing a reference voltage, and a comparator for comparing the sensed voltage to the reference voltage. By measuring the developed voltage across the terminals, the state of the switching device that may be connected in parallel may be determined, where low voltage indicates the other switching device in an 'on' state, and high voltage indicates an 'off' state. The switching device having the voltage sensing block follows the other switching device and shifts to 'on' or 'off' according to the other switching device state.

A device having two terminals connectable in series to an AC power source and a load for switching an AC power signal from the AC power source to the load is described. The device may comprise in a single enclosure a first terminal for connecting to the AC power source; a second terminal for connecting to the load; a first electrically controlled switching component comprising a first switch connected between third and fourth terminals that may be controlled by a first signal at a fifth terminal; a second electrically controlled switching component comprising a second switch connected between sixth and seventh terminals that may be controlled by a second signal at an eighth terminal; and a logic circuit coupled to output the first and second signals respectively to the fifth and eighth terminals. The first and second switches may be coupled in series to pass the AC power signal between the first and second terminals, the device may be powered only from the AC power signal, and the device may be configured to be in first and second states. In the first state the first and second switches may be controlled by the logic circuit to pass the AC power signal between the first and second terminals to power the load, and in the second state the first and second switches may be controlled by the logic circuit to stop the AC power signal between the first and second terminals. The logic circuit may consist of, or include, software and a processor for executing the software.

The logic circuit may be at least partially powered from the AC power signal. The first electrically controlled switching component, or the second electrically controlled switching component, may be based on, may be part of, or may consist of, a relay. The relay may be a solenoid-based electromagnetic relay, a reed relay, a solid-state, or a semiconductor based (such as Solid State Relay (SSR)) relay. Alternatively or in addition, the first electrically controlled switching component or the electrically controlled switching second component, may be based on, may comprise, or may consist of, an electrical circuit that comprises an open collector transistor, an open drain transistor, a thyristor, a TRIAC, or an opto-isolator. Alternatively or in addition, the first electrically controlled switching component or the second electrically controlled switching component, may be based on, may comprise, or may consist of, an electrical circuit or a transistor, that may be a field-effect power transistor such as an N-channel or a P-channel field-effect power transistor, the third connection or the sixth connection may be a 'drain' pin, the fourth connection or the seventh connection may be a 'source' pin, and the fifth terminal or the eighth terminal may be a 'gate' pin.

The device may further comprise an AC/DC converter connected to be power fed from the first and second terminals, and configured to supply a DC power, and may further comprise a capacitor or a battery connected to be charged from the DC power.

The device may further comprise a tactile sensor coupled to the logic circuit for shifting between the states in response to a human touch or a human mechanical activation. Alternatively or in addition, the device may be operative to shifting between the states in response to a remote command. The device may further comprise an antenna for receiving signals over the air, a wireless transceiver coupled to the antenna to receive the remote command from a wireless network, and the logic circuits may be coupled to the wireless transceiver to receive the remote command therefrom. The wireless network may be a Wireless Personal Area Network (WPAN), the wireless transceiver may be a WPAN transceiver, and the antenna may be a WPAN antenna, and the WPAN may be according to, or based on, Bluetooth™ or IEEE 802.15.1-2005standards, or the WPAN may be a wireless control network that may be according to, or based on, Zigbee™, IEEE 802.15.4-2003, or Z-Wave™ standards. Alternatively or in addition, the wireless network may be a Wireless Local Area Network (WLAN), the wireless transceiver may be a WLAN transceiver, and the antenna may be a WLAN antenna, and the WLAN may be according to, or base on, IEEE 802.11-2012, IEEE 802.11a, IEEE 802.11b, IEEE 802.11g, IEEE 802.11n, or IEEE 802.11ac. The wireless network may be over a licensed or unlicensed radio frequency band, such as an Industrial, Scientific and Medical (ISM) radio band. Alternatively or in addition, the wireless network may be a Wireless Wide Area Network (WWAN); the wireless transceiver may be a WWAN transceiver, and the antenna may be a WWAN antenna. The WWAN may be a wireless broadband network such as a WiMAX network; the antenna may be a WiMAX antenna, and the wireless transceiver may be a WiMAX modem, and the WiMAX network may be according to, or based on, IEEE 802.16-2009. Alternatively or in addition, the wireless network may be a cellular telephone network, the antenna may be a cellular antenna, and the wireless transceiver may be a cellular modem, and the cellular telephone network may be a Third Generation (3G) network that uses UMTS W-CDMA, UMTS HSPA, UMTS TDD, CDMA2000 1×RTT, CDMA2000 EV-DO, or GSM EDGE-Evolution, or the cellular telephone network may be a Fourth Generation (4G) network that uses HSPA+, Mobile WiMAX, LTE, LTE-Advanced, MBWA, or may be based on IEEE 802.20-2008.

The device may be further configured to substitute a light switch, and the single enclosure may be dimensioned and shaped to be installed in a light switch outlet cavity. The AC power may be a domestic mains, such as nominally 120 VAC/60 Hz or 230 VAC/50 Hz. The load may be a light source such as an electric light source for converting electrical energy into light. The electric light source may emit visible or non-visible light for illumination or indication, and the non-visible light may be infrared, ultraviolet, X-rays, or gamma rays. The electric light source may consist of, or may comprise, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

A system for switching AC power from the AC power source to the load is disclosed, the system comprising the load; and the device. The device may be connected in series between the AC power source and the load for switching the AC power from the AC power source to the load.

The device may further comprise an electrical energy-storing component, such as a rechargeable battery or a capacitor, for storing DC power and for powering the logic circuit; the component may be coupled in parallel to the second switch to be charged from the AC power signal. As part of the first state the device may be configured further to be in third and fourth states, in the third state the component may be charged from the AC power signal, and in the fourth state the logic circuit may be powered by the component.

The device may further comprise a voltage detector responsive to the detected voltage across the first and second terminals, across the second switch, or across the electrical energy-storing component, and the device may be configured to be in the third state when the detected voltage may be positive. The device may further be used with a voltage threshold, and the device may be configured to be in the third state when the detected voltage may be below the voltage threshold. Alternatively or in addition, the device may comprise a voltage detector responsive to the detected voltage across the first and second terminals, across the second switch, or across the electrical energy-storing component, and the device may be configured to be in the third state when the detected voltage may be negative. The device may further be used with a voltage threshold, and the device may be configured to be in the third state when the detected voltage may be above the voltage threshold. Alternatively or in addition, the device may be used with first and second voltage thresholds, and the device may further comprise a voltage detector responsive to the detected voltage across the first and second terminals, across the second switch, or across the electrical energy-storing component, and the device may be configured to be in the third state when the detected voltage may be between the first and second voltage thresholds. The first threshold may be zero volts.

The device may further comprise an occupancy sensor for detecting occupancy of a space by a human body, the sensor coupled to the logic circuit for shifting between the states in response to detecting a presence of a human by using electric effect, inductive coupling, capacitive coupling, triboelectric effect, piezoelectric effect, fiber optic transmission, or radar intrusion sensing. The occupancy sensor may consist of, comprise, or may be based on, a motion sensor, an acoustic sensor, opacity, geomagnetism, magnetic sensors, magnetometer, reflection of transmitted energy, infrared laser radar, microwave radar, electromagnetic induction, or vibration. The motion sensor may be a mechanically actuated sensor, passive or active electronic sensor, ultrasonic sensor, microwave sensor, tomographic detector, passive infrared (PIR) sensor, laser optical detector, or acoustical detector. Alternatively or in addition, the sensor may be a photoelectric sensor that responds to a visible or an invisible light, the invisible light may be infrared, ultraviolet, X-rays, or gamma rays, and the photoelectric sensor may be based on the photoelectric or photovoltaic effect, and may consist of, or comprise, a semiconductor component that consists of, or comprises, a photodiode, or a phototransistor. The photoelectric sensor may be based on Charge-Coupled Device (CCD) or a Complementary Metal-Oxide Semiconductor (CMOS) component.

The device may be used in a system for switching AC power from the AC power source to the load. The system may comprise the load that may be a domestic appliance that includes an actuator that converts electrical energy to affects a phenomenon; and the device. The device may be connected in series between the AC power source and the load for switching the AC power from the AC power source to the load. The actuator may be an electric thermoelectric actuator that may be a heater or a cooler, operative for affecting the temperature of a solid, a liquid, or a gas object, and may be coupled to the object by conduction, convection, forced convection, thermal radiation, or by the transfer of energy by phase changes. Alternatively or in addition, the actuator may be a sounder for converting an electrical energy to omnidirectional, unidirectional, or bidirectional pattern emitted, audible or inaudible, sound waves. The sound may be audible, and the sounder may be an electromagnetic loudspeaker, a piezoelectric speaker, an electrostatic loudspeaker (ESL), a ribbon or a planar magnetic loudspeaker, or a bending wave loudspeaker.

Alternatively or in addition, the actuator may be an electric thermoelectric actuator that may be a heater or a cooler, operative for affecting the temperature of a solid, a liquid, or a gas object, and may be coupled to the object by conduction, convection, force convention, thermal radiation, or by the transfer of energy by phase changes. The thermoelectric actuator may be a cooler based on a heat pump driving a refrigeration cycle using a compressor-based electric motor, or an electric heater that may be a resistance heater or a dielectric heater. Alternatively or in addition, the actuator may be a display for visually presenting information, the display may be a monochrome, grayscale or color display and consists of an array of light emitters or light reflectors, or a video display supporting Standard-Definition (SD) or High-Definition (HD) standards that may be capable of scrolling, static, bold or flashing the presented information.

Alternatively or in addition, the actuator may be a motion actuator that causes linear or rotary motion, and the system may further comprise a conversion mechanism for respectfully converting to rotary or linear motion based on a screw, a wheel and axle, or a cam. The motion actuator may be a pneumatic, a hydraulic, or an electrical actuator. The electrical actuator may be a brushed, a brushless, or an uncommutated DC motor, that may be a stepper motor using a Permanent Magnet (PM) motor, a Variable reluctance (VR) motor, or a hybrid synchronous stepper. Alternatively or in addition, the electrical motor may be an AC motor that may be an induction motor, a synchronous motor, or an eddy current motor, and may be a single-phase AC induction motor, a two-phase AC servo motor, or a three-phase AC synchronous motor, a split-phase motor, a capacitor-start motor, or a Permanent-Split Capacitor (PSC) motor.

The load may be a water heater, HVAC system, air conditioner, heater, washing machine, clothes dryer, vacuum cleaner, microwave oven, electric mixer, stove, oven, refrigerator, freezer, food processor, dishwasher, food blender, beverage maker, coffeemaker, answering machine, telephone set, home cinema system, HiFi system, CD or DVD player, induction cooker, electric furnace, trash compactor, electric shutter, or dehumidifier.

The device may further comprise in the single enclosure a sensor coupled to sense the voltage across the first switch, and the sensor may be coupled to the fifth terminal for producing the first in response to the sensed voltage. The device may further be operative to be powered from the AC power signal, and may further comprise an electrical energy-storing component coupled in parallel to the first switch to be charged from the AC power signal. The sensor may be coupled to be powered from the electrical energy-storing component, which may be a capacitor (such as an electrolytic or a tantalum capacitor) or a rechargeable battery. The device may further be operative to be in third and fourth states, in the third state the electrical energy-storing component may be charged from the AC power signal, and in the fourth state, the electrical energy-storing component may power the sensor. The device may further comprise a sensor for detecting positive and negative half-cycles of the AC power signal, and the device may be in the third state during an entire of, or a part of, one of the half-cycles, and the device may be in the fourth state during an entire of, or a part of, the other half-cycle.

The device may be used with a defined voltage threshold, and the sensor may be a comparator coupled to compare the voltage across the first switch to the voltage threshold. In the case the voltage across the first switch or the energy-storage component may be below the voltage threshold, the voltage may be supplied to the fifth terminal for stopping the AC power signal flow via the first switch. In the case the voltage across the first switch or the energy storage component may be above the voltage threshold, the voltage may be supplied to the fifth terminal for passing the power signal via the first switch.

The device may further be used for detecting polarity or magnitude of the AC power signal, and may further comprise in the single enclosure a voltage detector coupled to sense the polarity or the magnitude of the voltage across the first switch; and a logic circuit coupled to output the control voltage at a fifth terminal and to the voltage detector. The first switch may be closed so that the AC power signal may be passed from the AC power source to the load, and the logic circuit may output the first signal to the fifth terminal so as to open the switch for a time interval, and the voltage detector may sense the polarity or the magnitude of the power signal when the first switch may be configured to stop the AC power signal. The logic circuit outputs a control voltage to the fifth terminal periodically, and the time interval may be less than 1 millisecond. The AC power signal may be in a sinewave form including a positive half-cycle and a negative half-cycle in a cycle time period, and the time interval may be substantially less than the AC power signal time period, such as less than one tenth of the AC power signal time period. The device may be operative to sense and indicate one of the half-cycles of the AC power signal time period, and may periodically operative to outputs a control voltage to the fifth terminal until the detecting the non-indicated half-cycle of the AC power signal time period. Alternatively or in addition, the device may be operative to output the first signal to the fifth terminal in a delay after the non-indicated half-cycle of the AC power signal time period, and the delay may be higher than half of the cycle time period and may be lower than the cycle time period.

The device may further be operative to be powered from the AC power signal, and may further comprise an electrical energy-storing component (such as a capacitor or a rechargeable battery) coupled in parallel to the first switch to be charged from the AC power signal when the first switch may be configured for stopping the AC power signal flow via the first switch. The device may be further used with first and second voltage thresholds, and the electrical energy storing component may be charged from the AC power signal when the voltage detected across the first switch or across the electrical energy-storing component, may be between the first and second voltage thresholds, and the first voltage threshold may be zero volts.

Two such devices may be used in a multiway AC power switching system in a building that comprises an AC power source for supplying an AC power signal; an AC load connectable to be powered from the AC power source; a first device in a first single enclosure that may be dimensioned and shaped to be installed in a light switch outlet cavity; and a second device in a second single enclosure that may be dimensioned and shaped to be installed in a light switch outlet cavity. Each of the devices may be stopping the AC power signal in an open state for and may be passing the AC power signal in a closed state, each of the devices may be connected in series for switching the AC power signal from the AC power source to the AC load, and the first and second devices may be connected in parallel whereby each of switches may be configured to pass the AC power signal from the AC power source to the AC load. The first device may be located in a first location, and the second device may be located in a second location distinct from the first location, and the two devices may be connected via two wires in a wall of the building. The first device may further comprise a sensor for sensing the state of the second switch, and the sensor may be a voltage detector for detecting the voltage across the first device terminals. The sensing the state of the second device may be performed periodically, and the state of the first device may be determined based on the state of the second device. The first device may be operative during the closed state to stop the AC power signal for a time interval, whereby a voltage may be developed over the first device that may be sensed by the voltage detector, and the first device may be powered by the voltage developed across the second device.

The second device may further comprise a transmitter for sending the state of the second device, and the first device may further comprise a receiver for receiving the state of the second device from the transmitter. The first device may shift to the received state of the second device; the transmitter may be a wireless transmitter, and the receiver may be a wireless receiver. Each of the devices may further comprise a visual indicator for indicating the switch state. Further, each of the devices may comprise a tactile sensor for shifting between the states in response to a human touch or a human mechanical activation.

The device may be having two terminals connectable in series to a power source and a load for switching a power signal from the power source to the load. The device may comprise in a single enclosure a first terminal for connecting to the power source; a second terminal for connecting to the load; an electrically controlled switching component comprising a switch between third and fourth terminals that may be controlled by a voltage at a fifth terminal, the third terminal coupled to the first terminal and the fourth terminal coupled to the second terminal so that the power signal may be passed between the third and fourth terminals; and a sensor coupled to sense the voltage across the third and fourth terminals. The sensor may be coupled to the electrically controlled switching component for producing a voltage to the fifth terminal in response to the sensed voltage.

The device may further be operative to be powered from the power signal, and may further comprise an electrical energy-storing component (such as an electrolytic or tantalum capacitor, or a rechargeable battery) coupled to the third and fourth terminals to be charged from the power signal, and the sensor may be coupled to be powered from the electrical energy-storing component. The device may further be operative to be first and second states, wherein in the first state the electrical energy-storing component may be charged from the power signal, and in the second state the electrical energy-storing component may power the sensor. The device may be used with a defined voltage threshold, wherein the sensor may be a comparator coupled to compare the voltage across the third and fourth terminals to the voltage threshold. In the case the voltage across the third and fourth terminals or the energy storage component may be below the voltage threshold, the voltage may be supplied to the fifth terminal for stopping the power signal flow via the switch. In the case the voltage across the third and fourth terminals or the energy storage component may be above the voltage threshold, the voltage may be supplied to the fifth terminal for passing the power signal via the switch. The electrically controlled switching may be based on, or consists of, an electrical circuit or a transistor, which may be a field-effect power transistor (such as an N-channel or a P-channel field-effect power transistor) where the third terminal may be the 'drain' pin, the fourth terminal may be the 'source' pin, and the fifth terminal may be the 'gate' pin.

The power source may be an AC power source (such as a domestic mains), and the power signal may be an AC power signal such as nominally 120 VAC/60 Hz or 230 VAC/50 Hz. The load may be a light source such as an electric light source for converting electrical energy into light. Further, the device may comprise a capacitor and may be operative to be in first and second states, and where in the first state the capacitor may be charged from the AC power signal, and in the second state the capacitor may power the sensor. The device may further comprise a sensor for detecting positive and negative half-cycles of the AC power signal, and the device may be in the first state during an entire of, or a part of, one of the half-cycles, and the device may be in the second state during an entire of, or a part of, the other half-cycle.

The device may comprise a DC converter coupled to the first and second terminal for passing of, and for being powered by, the power signal. The power signal may be an AC power signal, and the DC converter may be an AC/DC converter. Alternatively or in addition, the power signal may be a DC power signal, and the DC converter may be a DC/DC converter. The device may further comprise an electrical energy-storing component coupled to be charged from the DC converter, and for powering the sensor from the electrical energy-storing component.

The device may further be used for detecting polarity or magnitude of the power signal. The device may further comprise in the single enclosure a voltage detector coupled to sense the polarity or the magnitude of the voltage across the third and fourth terminals, and a logic circuit coupled to output the control voltage at a fifth terminal and to the voltage detector. The switch may be closed so that the power signal may be passed from the power source to the load, the logic circuit may output a control voltage to the fifth terminal so as to open the switch for a time interval, and the voltage detector may sense the polarity or the magnitude of the power signal when the switch may be configured to stop the power signal. The logic circuit may output a control voltage to the fifth terminal periodically, such as where the time interval may be less than 1 millisecond. Further, the power source may be an AC power source and the power signal may be an AC power signal in a sinewave form including a positive half-cycle and a negative half-cycle in a cycle time period. The time interval may be substantially less than the AC power signal time period, such as less than one tenth of the AC power signal time period. The device may further be operative to sense and indicate one of the half-cycles of the AC power signal time period, and may be periodically operative to outputs a control voltage to the fifth terminal until the detecting the non-indicated half-cycle of the AC power signal time period. Further, the device may be operative to outputs a control voltage to the fifth terminal in a delay after the non-indicated half-cycle of the AC power signal time period, and the delay may be higher than half of the cycle time period and may be lower than the cycle time period.

The device may further be operative to be powered from the power signal, and may further comprise an electrical energy-storing component, which may be a capacitor or a rechargeable battery, coupled in parallel to the switch to be charged from the power signal when the switch may be configured for stopping the power signal flow between the third and fourth terminals. The device may further be used with first and second voltage thresholds, wherein the electrical energy-storing component may be charged from the power signal when the voltage detected across the first and second terminals, across the third and fourth terminals, or across the electrical energy-storing component, may be between the first and second voltage thresholds. The first voltage threshold may be zero volts.

The device may be operative to be in first, second, and third states, wherein in the first state the logic circuit may output a control voltage to the fifth terminal periodically, in the second state the electrical energy storing component may be charged from the power signal, and in the third state the switch may be configured to continuously pass the power signal. The device may shift from the first state to the second state upon detecting a change of the detected voltage polarity, and may be in the second state when the voltage detected across the first and second terminals, across the third and fourth terminals, or across the electrical energy-storing component, may be between the first and second voltage thresholds. The device may be in the third state for a time interval. The power source may be an AC power source and the power signal may be an AC power signal in sinewave form including a positive half-cycle and a negative half-cycle in a cycle time period, and the time interval may be between an half-cycle period to a full-cycle period.

Two devices may be used in a multiway AC power switching system in a building. The system may comprise an AC power source for supplying an AC power signal; an AC load connectable to be powered from the AC power source; a first device in a first single enclosure that may be dimensioned and shaped to be installed in a light switch outlet cavity; and a second device in a second single enclosure that may be dimensioned and shaped to be installed in a light switch outlet cavity. Each of the devices may be stopping the AC power signal in an open state for and may be passing the AC power signal in a closed state, and each of the devices may be connected in series for switching the AC power signal from the AC power source to the AC load, and the first and second devices may be connected in parallel whereby each of switches may be configured to pass the AC power signal from the AC power source to the AC load. The first device may be located in a first location and the second device may be located in a second location that may be distinct from the first location, and the two devices may be connected via two wires in a wall of the building.

The first device may further comprise a sensor for sensing the state of the second switch, and the sensor may be a voltage detector for detecting the voltage across the first device terminals, such as for periodically sensing the state of the second device. The state of the first device may be determined based on the state of the second device. The first device may be operative during the closed state to stop the AC power signal for a time interval, whereby a voltage may be developed over the first device that may be sensed by the voltage detector. The first device may be powered by the voltage developed across the second device. The second device may further comprise a transmitter (such as a wireless transmitter) for sending the state of the second device, and the first device may further comprise a receiver (such as a wireless receiver) for receiving the state of the second device from the transmitter, and the first device may shift to the received state of the second device. Each of the switches may further comprise a visual indicator indicating the switch state, and each of the devices may further comprise a tactile sensor for shifting between the states in response to a human touch or a human mechanical activation.

The device may be having two terminals for detecting polarity or magnitude of a power signal, and connectable in series between a power source and a load for switching the power signal from the power source to the load. The device may comprise in a single enclosure a first terminal for connecting to the power source; a second terminal for connecting to the load; an electrically controlled switching component comprising a switch between third and fourth terminals that may be controlled by a control voltage at a fifth terminal, the third terminal coupled to the first terminal and the fourth terminal coupled to the second terminal so that the power signal may be passed between the third and fourth terminals; a voltage detector coupled to sense the polarity or the magnitude of the voltage across the third and fourth terminals; and a logic circuit coupled to output the control voltage at a fifth terminal and to the voltage detector. When the switch may be closed so that the power signal may be passed from the power source to the load, the logic circuit may output a control voltage to the fifth terminal so as to open the switch for a time interval, and the voltage detector may sense the polarity or the magnitude of the power signal when the switch may be configured to stop the power signal.

The logic circuit may output a control voltage to the fifth terminal periodically, such as using the time interval that may be less than 1 millisecond. The power source may be an AC power source and the power signal may be an AC power signal in sinewave form including a positive half-cycle and a negative half-cycle in a cycle time period. The time interval may be substantially less than the AC power signal time period, such as less than one tenth of the AC power signal time period. The device may be operative to sense and indicate one of the half-cycles of the AC power signal time period, and may be periodically operative to outputs a control voltage to the fifth terminal until the detecting the non-indicated half-cycle of the AC power signal time period. Alternatively or in addition, the device may be operative to output a control voltage to the fifth terminal in a delay after the non-indicated half-cycle of the AC power signal time period, and the delay may be higher than half of the cycle time period, and may be lower than the cycle time period.

The device may be further operative to be powered from the power signal, and may further comprise an electrical energy-storing component coupled in parallel to the switch to be charged from the power signal when the switch may be configured for stopping the power signal flow between the third and fourth terminals. The device may be used with first and second voltage thresholds, wherein the electrical energy-storing component may be charged from the power signal when the voltage detected across the first and second terminals, across the third and fourth terminals, or across the electrical energy-storing component, may be between the first and second voltage thresholds. The first voltage threshold may be zero volts.

The device may further be operative to be in first, second, and third states, wherein in the first state the logic circuit may output a control voltage to the fifth terminal periodically, in the second state the electrical energy-storing component may be charged from the power signal, and in the third state the switch may be configured to continuously pass the power signal. The device may shift from the first state to the second state upon detecting a change of the detected voltage polarity, and may be in the second state when the voltage detected across the first and second terminals, across the third and fourth terminals, or across the electrical energy-storing component, may be between the first and second voltage thresholds. The device may be in the third state for a time interval. The power source may be an AC power source and the power signal may be an AC power signal in sinewave form including a positive half-cycle and a negative half-cycle in a cycle time period, and wherein the time interval may be between an half-cycle period to a full-cycle period.

A multiway AC power switching system in a building may comprise an AC power source for supplying an AC power signal; an AC load connectable to be powered from the AC power source; a first switch in a first single enclosure that may be dimensioned and shaped to be installed in a light switch outlet cavity; and a second switch in a second single enclosure that may be dimensioned and shaped to be installed in a light switch outlet cavity. Each of the switches may be stopping the AC power signal in an open state for and may be passing the AC power signal in a closed state. Each of the switches may be connected in series for switching the AC power signal from the AC power source to the AC load, and the first and second switches may be connected in parallel whereby each of switches may be configured to pass the AC power signal from the AC power source to the AC load. The first switch may be located in a first location and the second switch may be located in a second location distinct from the first location, and the two switches may be connected via two wires in a wall of the building. The first switch may further comprise a sensor for sensing the state of the second switch, and the sensor may be a voltage detector for detecting the voltage across the first switch terminals, such as for periodically sensing the state of the second switch. The state of the first switch may be determined based on the state of the second switch, and the first switch may be operative during the closed state to stop the power signal for a time interval, whereby a voltage may be developed over the first switch that may be sensed by the voltage detector, and the first switch may be powered by the voltage developed across the second switch. The second switch may further comprise a wireless transmitter for sending the state of the second switch, the first switch may further comprising a wireless receiver for receiving the state of the second switch from the transmitter, and the first switch may shift to the received state of the second switch. Each of the switches may further comprise a visual indicator indicating the switch state, and each of the switches may further comprise a tactile sensor for shifting between the states in response to a human touch or a human mechanical activation.

The device may comprise a firmware and a processor for executing the firmware, and the processor may be coupled to the first control port for outputting the first signal. The device may comprise a tactile sensor coupled to the processor for outputting the first signal in response to a human touch. Alternatively or in addition, the device may be operative to outputting the first signal in response to a remote command, such as using an antenna for receiving signals over the air, and a wireless transceiver coupled to the antenna to receive the remote command from a wireless network, where the processor may be coupled to the wireless transceiver to receive the remote command therefrom. The wireless network may be a Wireless Personal Area Network (WPAN), where the wireless transceiver may be a WPAN transceiver, and the antenna may be a WPAN antenna, such as according to, or based on, Bluetooth™ or IEEE 802.15.1-2005 standards, or according to, or based on, Zigbee™, IEEE 802.15.4-2003, or Z-Wave™ standards. The wireless network may be a Wireless Local Area Network (WLAN), where the wireless transceiver may be a WLAN transceiver, and the antenna may be a WLAN antenna, and the WLAN may be according to, or base on, IEEE 802.11-2012, IEEE 802.11a, IEEE 802.11b, IEEE 802.11g, IEEE 802.11n, or IEEE 802.11ac. The wireless network may be over a licensed or unlicensed radio frequency band, such as an Industrial, Scientific and Medical (ISM) radio band. The wireless network may be a Wireless Wide Area Network (WWAN), where the wireless transceiver may be a WWAN transceiver, and the antenna may be a WWAN antenna, such as a wireless broadband network, for example a WiMAX network, wherein the antenna may be a WiMAX antenna and the wireless transceiver may be a WiMAX modem, and the WiMAX network may be according to, or based on, IEEE 802.16-2009. The wireless network may be a cellular telephone network, where the antenna may be a cellular antenna, and the wireless transceiver may be a cellular modem, and the cellular telephone network may be a Third Generation (3G) network that uses UMTS W-CDMA, UMTS HSPA, UMTS TDD, CDMA2000 1×RTT, CDMA2000 EV-DO, or GSM EDGE-Evolution, or may be a Fourth Generation (4G) network that uses HSPA+, Mobile WiMAX, LTE, LTE-Advanced, MBWA, or may be based on IEEE 802.20-2008.

An apparatus or device having two terminals connectable in series to an AC power source and a load for switching an AC power signal from the AC power source to the load is disclosed. The device may comprise in a single enclosure a first terminal for connecting to the AC power source; a second terminal for connecting to the load; a first variable-resistance component comprising a first variable resistance between third and fourth terminals that may be controlled by a first signal at a fifth terminal; a second variable-resistance component comprising a second variable resistance between sixth and seventh terminals that may be controlled by a second signal at an eighth terminal; and a software and a processor for executing the software, the processor may be coupled to output the first and second signals respectively to the fifth and eighth terminals. The first and second resistances may be coupled in series to pass the AC power signal between the first and second terminals, and the device may only powered from the AC power signal. Further, the device may be configured to be in first and second states, wherein in the first state the first and second resistances may be controlled by the processor to conduct the AC power signal between the first and second terminals to power the load, and wherein in the second state the first and second resistances may be controlled by the processor to stop the AC power signal between the first and second terminals.

The device may further comprise a capacitor for storing DC power and for powering the processor; the capacitor may be coupled in parallel to the second resistance to be charged from the AC power signal. In the first state the device may be configured to be in third and fourth states, wherein in the third state, the capacitor may be charged from the AC power signal, and in the fourth state, the processor may be powered by the capacitor. The first resistance or the second resistance may consist of, or comprise, a switch, and the first component or second component may be based on, part of, or consist of, a relay, such as a solenoid-based electromagnetic relay, a Solid State Relay (SSR), a reed relay, or a solid-state or semiconductor based relay.

The first component or second component may be based on, comprise, or consist of, an electrical circuit that may comprise an open collector transistor, an open drain transistor, a thyristor, a TRIAC, or an opto-isolator. The first component or the second component may be based on, comprise, or consist of, an electrical circuit or a transistor. The transistor may be a field-effect power transistor, such as an N-channel enhanced mode standard level field-effect power transistor, wherein the third connection or the sixth connection may be a 'drain' pin, the fourth connection or the seventh connection may be a 'source' pin, and the fifth terminal or the eighth terminal may be a 'gate' pin.

The device may be comprising an AC/DC converter connected to be power fed from the first and second terminals, and configured to supply a DC power, and may further be comprising a capacitor connected to be charged from the DC power. The device may further comprise a tactile sensor coupled to the processor for shifting between the states in response to a human touch. Alternatively or in addition, the device may be further operative to shifting between the states in response to a remote command. The device may further comprise an antenna for receiving signals over the air, a wireless transceiver coupled to the antenna to receive the remote command from a wireless network, and the processor may be coupled to the wireless transceiver to receive the remote command therefrom. The wireless network may be a Wireless Personal Area Network (WPAN) that may be according to, or based on, Bluetooth™, the wireless transceiver may be a WPAN transceiver, and the antenna may be a WPAN antenna. The WPAN may be based on, or according to, Bluetooth™ or IEEE 802.15.1-2005standards, and the WPAN may be a wireless control network that may be according to, or based on, Zigbee™, IEEE 802.15.4-2003, or Z-Wave™ standards. Alternatively or in addition, the wireless network may be a Wireless Local Area Network (WLAN) that may be according to, or base on, IEEE 802.11-2012, IEEE 802.11a, IEEE 802.11b, IEEE 802.11g, IEEE 802.11n, or IEEE 802.11ac, the wireless transceiver may be a WLAN transceiver, and the antenna may be a WLAN antenna. Further, the wireless network may be over a licensed or unlicensed radio frequency band, such as an Industrial, Scientific and Medical (ISM) radio band.

Alternatively or in addition, the wireless network may be a Wireless Wide Area Network (WWAN), the wireless transceiver may be a WWAN transceiver, and the antenna may be a WWAN antenna. The WWAN may be a wireless broadband network such as a WiMAX network, wherein the antenna may be a WiMAX antenna, the wireless transceiver may be a WiMAX modem, and the WiMAX network may be according to, or based on, IEEE 802.16-2009. Alternatively or in addition, the wireless network may be a cellular telephone network, the antenna may be a cellular antenna, and the wireless transceiver may be a cellular modem. The cellular telephone network may be a Third Generation (3G) network that uses UMTS W-CDMA, UMTS HSPA, UMTS TDD, CDMA2000 1xRTT, CDMA2000 EV-DO, or GSM EDGE-Evolution, and the cellular telephone network may be a Fourth Generation (4G) network that uses HSPA+, Mobile WiMAX, LTE, LTE-Advanced, MBWA, or may be based on IEEE 802.20-2008.

The device may be further configured to substitute a light switch, wherein the single enclosure may be dimensioned and shaped to be installed in a light switch outlet cavity. The AC power may be domestic mains that may be nominally 120 VAC/60 Hz or 230 VAC/50 Hz. Further, the load may be a light source that may be an electric light source for converting electrical energy into light, and may emit visible or non-visible light for illumination or indication, the non-visible light may be infrared, ultraviolet, X-rays, or gamma rays. The electric light source may consist of, or comprise, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

A system is further disclosed for switching AC power from the AC power source to the load, the system comprising the load and the device, and the device may be connected in series between the AC power source and the load for switching the AC power from the AC power source to the load. A device is disclosed having two terminals connectable in series to a power source and a load for switching a power signal from the power source to the load. The device may comprise in a single enclosure a first terminal for connecting to the power source; a second terminal for connecting to the load; a variable-resistance component comprising a resistance between third and fourth terminals that may be controlled by a voltage at a fifth terminal, the third terminal coupled to the first terminal and the fourth terminal coupled to the second terminal so that the power signal may be passed between the third and fourth terminals; and a sensor coupled to sense the voltage across the third and fourth terminals. The sensor may be coupled to the variable-resistance component for producing a voltage to the fifth terminal in response to the sensed voltage. The device may be operative to be powered from the power signal, the device may further comprise a capacitor coupled to the third and fourth terminals to be charged from the power signal. The sensor may be coupled to be powered from the capacitor that may be an electrolytic or a tantalum capacitor.

The device may be further operative to be first and second states, wherein in the first state the capacitor may be charged from the power signal, and in the second state the capacitor may power the sensor. The device may be used with a voltage threshold, wherein the sensor may be a comparator coupled to compare the voltage across the third and fourth terminals to the voltage threshold, and if the voltage across the third and fourth terminals may be below the voltage threshold, the voltage may be supplied to the fifth terminal for increasing the resistance between the third and fourth terminals. Further, if the voltage across the third and fourth terminals may be above the voltage threshold, the voltage may be supplied to the fifth terminal for reducing the resistance between the third and fourth terminals.

The variable-resistance component may be based on, or consist of, an electrical circuit or a transistor, that may be a field-effect power transistor, where the third terminal may be the 'drain' pin, the fourth terminal may be the 'source' pin, and the fifth terminal may be the 'gate' pin. The field-effect power transistor may be an N-channel enhanced mode standard level field-effect power transistor.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope.

DETAILED DESCRIPTION

Figure 1:
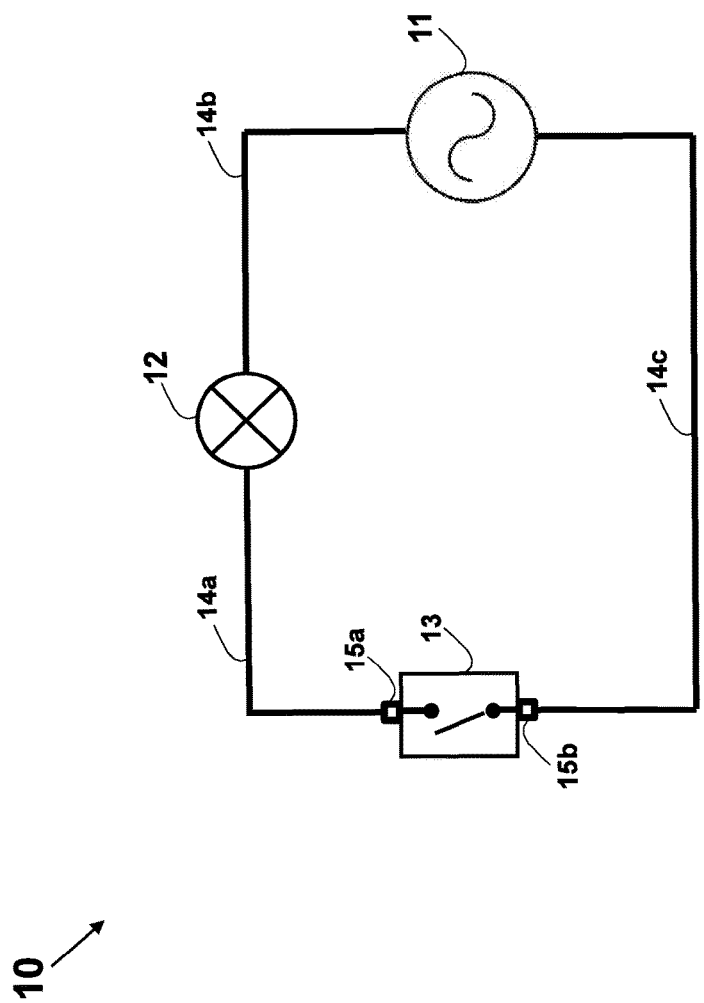
FIG. 1 illustrates a schematic electrical diagram of a prior-art wiring of a typical lighting system in a building.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 3:
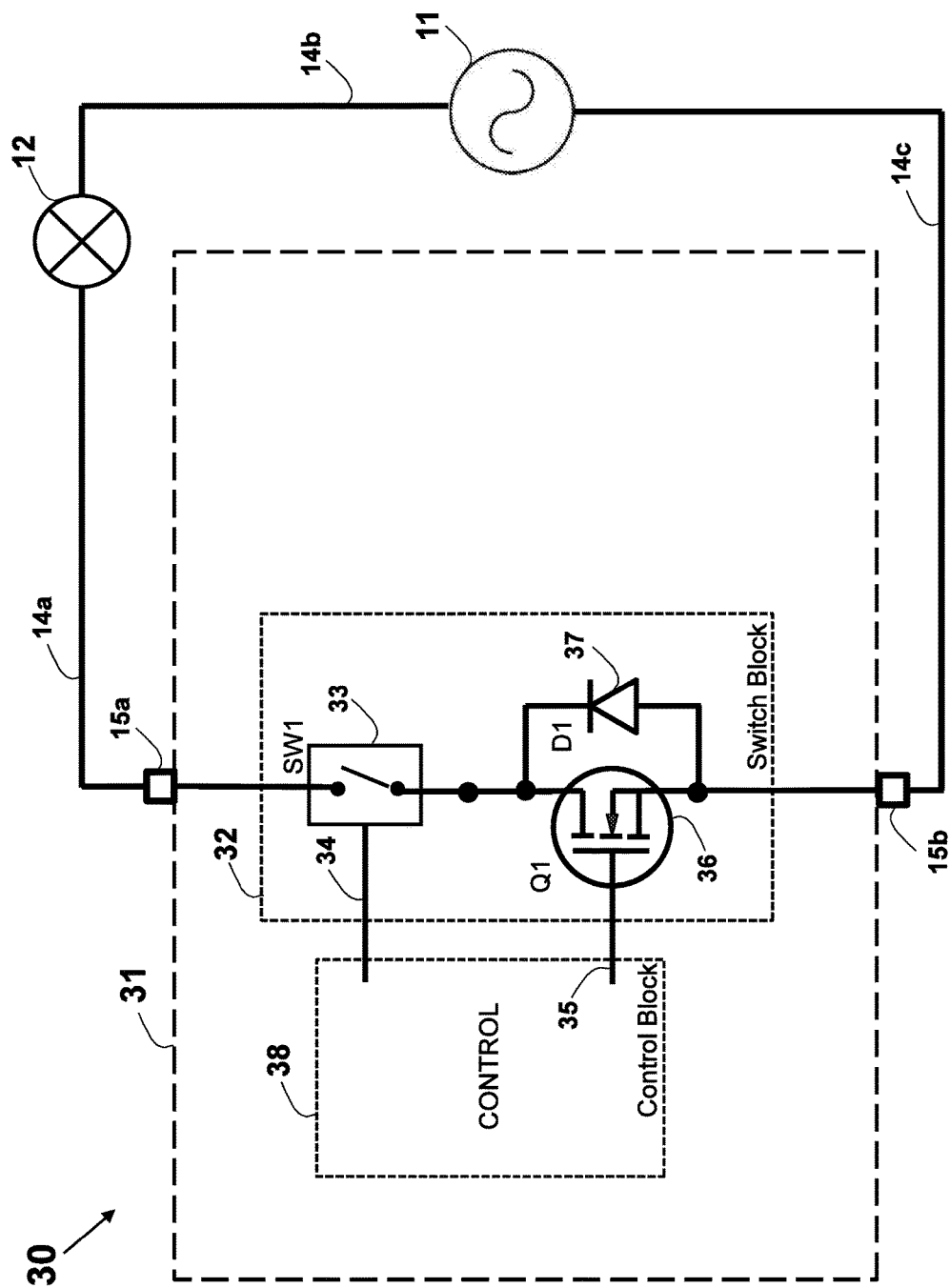
FIG. 3 illustrates a schematic electrical block diagram of an exemplary switch block in a switch device.

FIG. 3 shows an electrical schematic diagram 30 where the switch 13 is substituted with, or added to, a switch device 31, connecting the load 12 via the two terminals 15a and 15b to the AC power source 11. The switch device 31 comprises a switch block 32, through which a current is switched to the load 12. The switch block 32 is connected (or coupled) between the terminals 15a and 15b, and is based on two electrically controlled switches connected in series. In one example, one of the switches is SW1 33, actuated under a control via a line (or connection) 34. The other switch may be based on an MOSFET Q1 36, controlled via a line (or connection) 35 connected to a 'gate' terminal. Further, a diode D1 37 is connected in parallel to 'drain' and 'source' terminals of transistor Q1 36. When the two switches SW1 33 and Q1 36 are 'closed' or conductive, a current is flowing to the load 12, and in the case of a lamp, the lamp 12 illuminates. If one of the switches is 'open' or non-conductive, no current is flowing to the load 12 rendering the load 12 non-operative. A control block 38 is connected to control the switch block 32, and by applying control signals to the line 34 to control the switch SW1 33, and to the line 35 to control the MOSFET Q1 36, sets the switch device 31 state, to turn 'on' or 'off' the load 12.

Any component that is designed to open (breaking, interrupting), close (making), or change one or more electrical circuits may serve as, or replace, the switch SW1 33 or the transistor Q1 36, typically under some type of an electrical control. Preferably, the switch is an electromechanical device with one or more sets of electrical contacts having two or more states. The switch may be a 'normally open' type, requiring actuation for closing the contacts, may be 'normally closed' type, where actuation affects breaking the circuit, or may be a changeover switch, having both types of contacts arrangements. A changeover switch may be either a 'make-before-break' or 'break-before-make' types. The switch contacts may have one or more poles and one or more throws. Common switch contacts arrangements include Single-Pole-Single-Throw (SPST), Single-Pole-Double-Throw (SPDT), Double-Pole-Double-Throw (DPDT), Double-Pole-Single-Throw (DPST), and Single-Pole-Changeover (SPCO). A switch may be electrically or mechanically actuated.

A relay is a non-limiting example of an electrically operated switch. A relay may be a latching relay, that has two relaxed states (bistable), and when the current is switched off, the relay remains in its last state. This is achieved with a solenoid operating a ratchet and cam mechanism, or by having two opposing coils with an over-center spring or permanent magnet to hold the armature and contacts in position while the coil is relaxed, or with a permanent core. A relay may be an electromagnetic relay, that typically consists of a coil of wire wrapped around a soft iron core, an iron yoke which provides a low reluctance path for magnetic flux, a movable iron armature, and one or more sets of contacts. The armature is hinged to the yoke and mechanically linked to one or more sets of moving contacts. It is held in place by a spring so that when the relay is de-energized there is an air gap in the magnetic circuit. In this condition, one of the two sets of contacts in the relay pictured is closed, and the other set is open. A reed relay is a reed switch enclosed in a solenoid, and the switch has a set of contacts inside an evacuated or inert gas-filled glass tube, which protects the contacts against atmospheric corrosion.

Alternatively or in addition, a relay may be a Solid State Relay (SSR), where a solid-state based component functioning as a relay, without having any moving parts. Alternatively or in addition, a switch may be implemented using an electrical circuit or component. For example, an open collector (or open drain) based circuit may be used. Further, an opto-isolator (a.k.a. optocoupler, photocoupler, or optical isolator) may be used to provide isolated power transfer.

Further, a thyristor such as a Triode for Alternating Current (TRIAC) may be used for triggering the power. In one example, the switch SW1 33 in based on, or consists of, a TRIAC Part Number BTA06 available from SGS-Thomson Microelectronics is used, described in the data sheet "BTA06 T/D/S/A BTB06 T/D/S/A—Sensitive Gate Triacs' published by SGS-Thomson Microelectronics march 1995, which is incorporated in its entirety for all purposes as if fully set forth herein.

In addition, the switch unit may be based on a transistor. The transistor may be a Metal-Oxide-Semiconductor Field-Effect Transistor (MOSFET, MOS-FET, or MOS FET), commonly used for amplifying or switching electronic signals. The MOSFET transistor is a four-terminal device with source (S), gate (G), drain (D), and body (B) terminals, where the body (or substrate) of the MOSFET is often connected to the source terminal, making it a three-terminal device like other field-effect transistors. In an enhancement mode MOSFETs, a voltage drop across the oxide induces a conducting channel between the source and drain contacts via the field effect. The term "enhancement mode" refers to the increase of conductivity with an increase in oxide field that adds carriers to the channel, also referred to as the inversion layer. The channel can contain electrons (called an nMOSEET or nMOS), or holes (called a pMOSEET or pMOS), opposite in type to the substrate, so nMOS is made with a p-type substrate, and pMOS with an n-type substrate (see article on semiconductor devices). In one example, the transistor Q1 36 is an N-channel enhancement mode standard level field-effect transistor that features very low on-state resistance. Such a transistor Q1 36 may be based on, or consists of, TrenchMOS transistor Part Number BUK7524-55 from Philips Semiconductors, described in the Product Specifications from Philips Semiconductors "TrenchMOS™ transistor Standard level FET BUK7524-55" Rev 1.000 dated January 1997, which is incorporated in its entirety for all purposes as if fully set forth herein. In this case, the diode D1 37 is integrated in the transistor Q1 36 case.

Figure 3A:
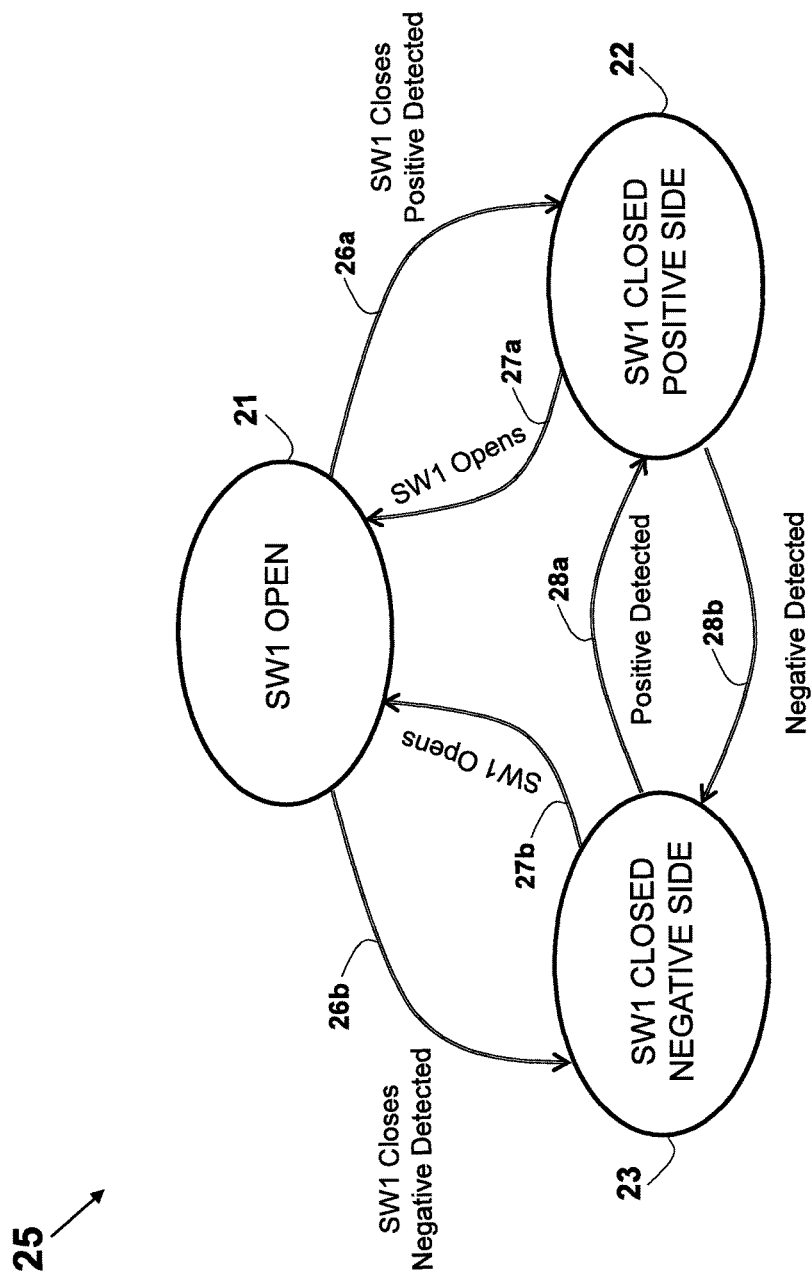
FIG. 3a illustrates schematically the states of a switch device.

As shown in a state diagram 25 in FIG. 3a, the switch device 31 may be in one of three distinct states, under the control of the control block 38. In the state "SW1 OPEN" 21 the SW1 switch 33 is controlled by the control port 34 to be open, thus blocking any current flow through it. In this case, the lamp 12 is turned 'off' as no current (except leakage current) is flowing from the power source 11 to the lamp 12. In states "SW1 CLOSED—POSITIVE SIDE" 22 and "SW1 CLOSED—NEGATIVE SIDE" 23 the SW1 switch 33 is controlled by the control port 34 to be closed, thus allowing current flow through it. In this case, the lamp 12 is turned 'on' as AC current is flowing from the power source 11 to the lamp 12. The state "SW1 CLOSED—POSITIVE SIDE" 22 is effective when the voltage detected between the switch device 31 terminals 15a and 15b is positive: The voltage at the terminal 15a is higher than the voltage at the terminal 15b, which occurs during half of the AC power cycle ('positive half-cycle'). Similarly, the state "SW1 CLOSED—NEGATIVE SIDE" 23 is effective when the voltage detected between the switch device 31 terminals 15a and 15b is negative: The voltage at the terminal 15a is lower than the voltage at the terminal 15b, which occurs during the other half of the AC power cycle ('negative half-cycle'). Upon sensing the opening of SW1 33, regardless of the existing switch 31 states, the switch device 31 reverts to the 'SW1 OPEN' state 21, as indicated by mows 27a and 27b. Upon sensing closing of the switch SW1 33, the voltage at the terminals 15a and 15b is detected. In the case a positive voltage is detected, the switch device 31 shifts to a state "SW1 CLOSED—POSITIVE SIDE" 22 as shown by an arrow 26a, and remains in this state throughout the positive half-cycle, as long as positive voltage is detected. In the case a negative voltage is detected, the switch device 31 shifts (arrow 28b) to the "SW1 CLOSED—NEGATIVE SIDE" state 23, and remains in this state throughout the negative half-cycle, as long as negative voltage is detected. Similarly, in the case the switch is in "SW1 OPEN" state 21 and a negative voltage is detected, the switch device 31 shifts to the state "SW1 CLOSED—NEGATIVE SIDE" 23 as shown by an arrow 26b, and remains in this state throughout the negative half-cycle, as long as a negative voltage is detected. In the case a positive voltage is detected, the switch device 31 shifts (arrow 28a) to the "SW1 CLOSED—POSITIVE SIDE" state 22, and remains in this state throughout the positive half-cycle, as long as a positive voltage is detected.

Figure 4:
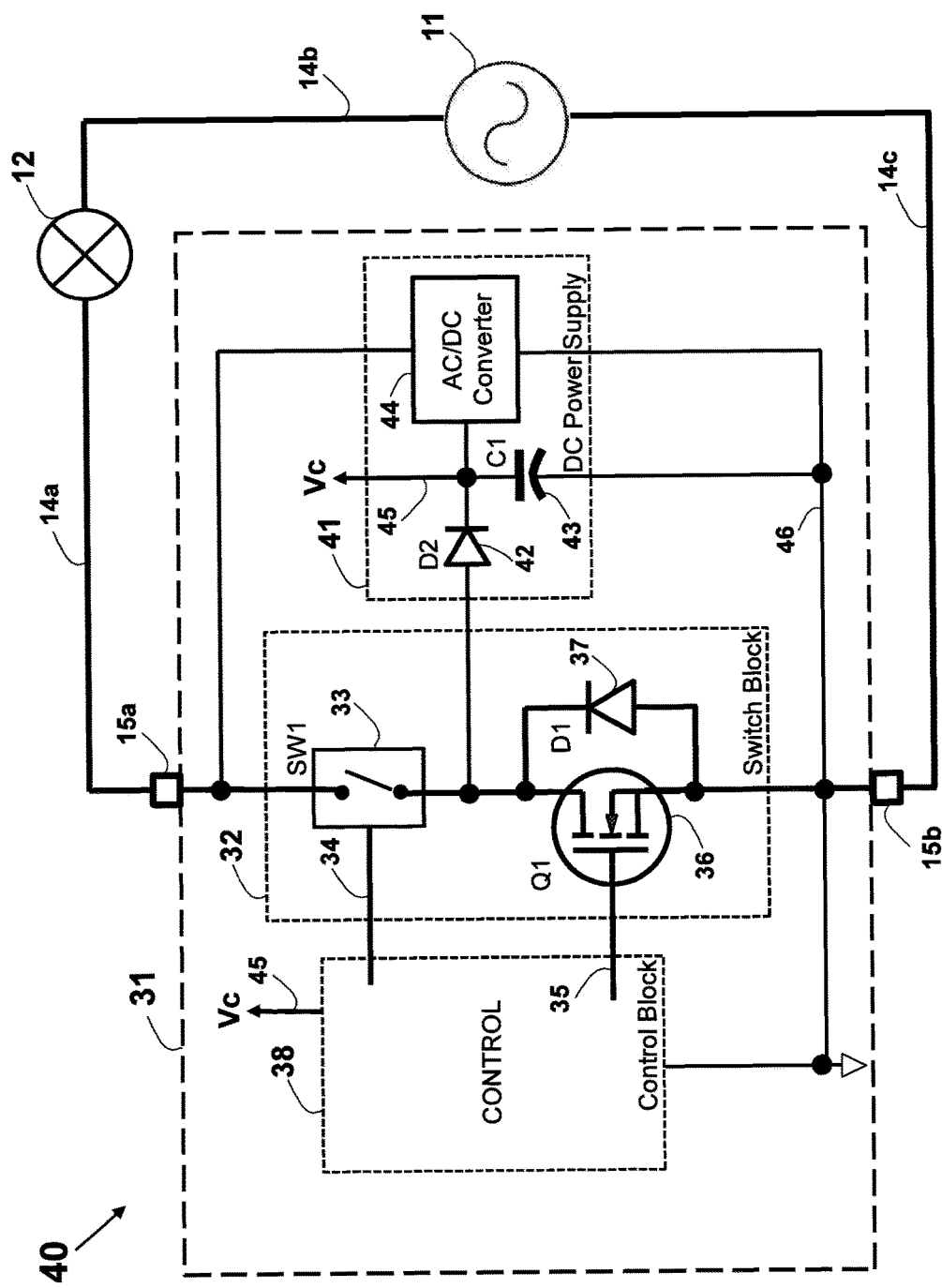
FIG. 4 illustrates a schematic electrical block diagram of an exemplary DC power supply block in a switch device.

The control block 38 and other electronic circuits (such as digital logic circuits) in the switch device 31 may require a low DC voltage for operation, such as 5 VDC or 3.3 VDC. The required DC voltage is provided by a DC power supply block 41 shown in FIG. 4 as part of an electronic schematic diagram 40. The DC power supply block 41 provides a regulated DC voltage designated Vc via a line 45 (for example 5 VDC or 3.3 VDC), where the internal low level return (or ground) is a line 46 connected to the terminal 15b. The DC power supply block 41 comprises a diode D2 42 connected between the Vc output line 45 and the connection between the switch SW1 33 and the transistor Q1 36 drain connection. Further, the DC power supply includes an AC/DC converter 44 connected to be powered from the AC power source 11 via the terminals 15a and 15b, and having a DC output feeding the Vc line 45. Further, the DC power supply block 41 includes a capacitor C1 43 used to supply, regulate, filter, and stabilize, the Vc line 45 output.

The AC/DC converter 44 is used for converting the AC voltage developed on the switch device 31 terminals into the required low-level stabilized DC voltage or voltages, commonly suitable for power the digital circuits, such as 3.3 VDC, 5 VDC, or 12 VDC. Power supplies commonly include voltage stabilizers for ensuring that the output remains within certain limits under various load conditions, and typically employs a transformer, silicon diode bridge rectifier, reservoir capacitor and voltage regulator IC. Switched mode regulator supplies also typically include an inductor. The converter 44 may include a boost converter, such as a buck boost converter, charge pump, inverter and regulators as known in the art, as required for conversion of one form of electrical power to another desired form and voltage. The capacitor C1 43 may be a polarized capacitor, such as an electrolytic capacitor or tantalum capacitor. An electrolytic capacitor is a capacitor that uses an electrolyte (an ionic conducting liquid) as one of its plates to achieve a larger capacitance per unit volume than other types. The large capacitance of electrolytic capacitors makes them particularly suitable for passing or bypassing low-frequency signals and storing large amounts of energy. A tantalum capacitor is a type of electrolytic capacitor, a component of electronic circuits. It typically consists of a pallet of tantalum metal as an anode, covered by an insulating oxide layer that forms the dielectric, surrounded by conductive material as a cathode. The tantalum capacitor distinguishes itself from other capacitors in having a high capacitance per volume and weight. Tantalum capacitors have lower equivalent series resistance (ESR), lower leakage, and higher operating temperature than other electrolytic capacitors. In one example, the capacitor C1 43 is a tantalum capacitor having a value of 1000 microfarad (μF).

Figure 5A:
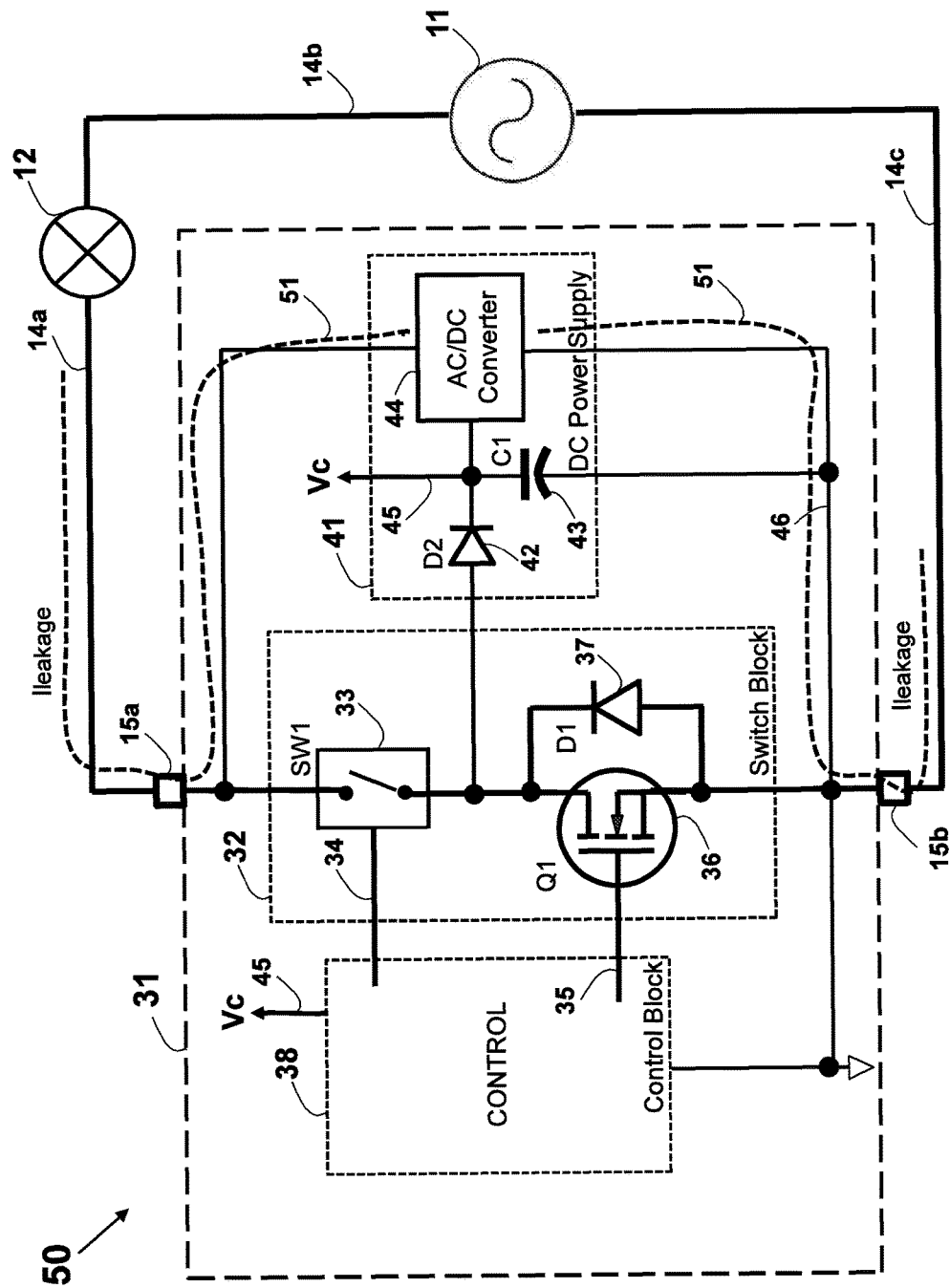
FIG. 5a illustrates schematically the leakage current flow in a switch device.

A schematic diagram 50 in FIG. 5a shows the switch device 31 during the "SW1 OPEN" state 21. The switch SW1 33 is controlled via its control port 34 to be open, so no current is flowing through the switch block 32. In this state a leakage current is flowing through the AC/DC Converter 44 in the DC Power Supply block 41, as shown in dashed line 51. The AC/DC converter 44 outputs the DC voltage Vc at port 45, and charges the capacitor C1 43.

Figure 5B:
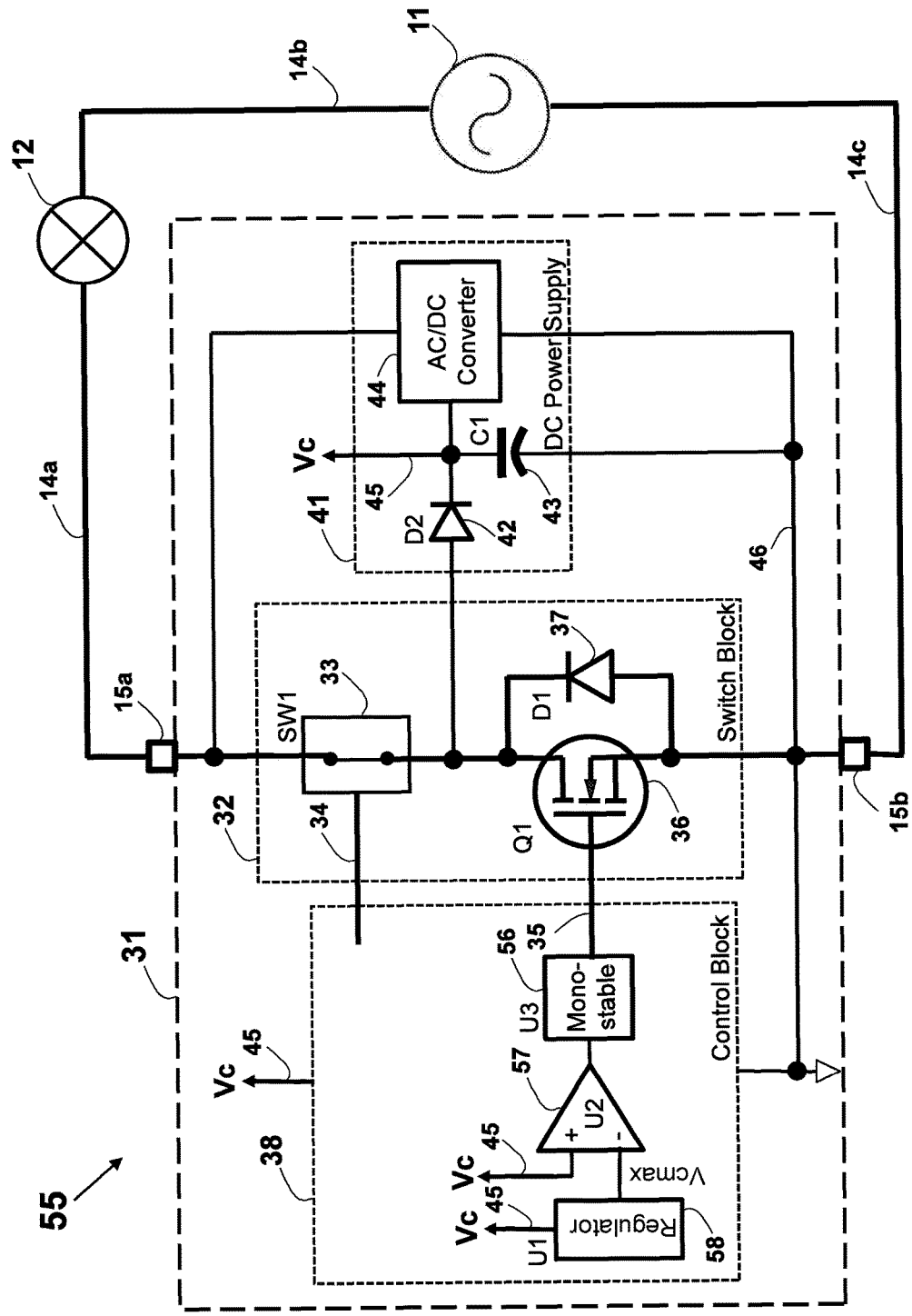
FIG. 5b illustrates a schematic electrical block diagram of part of an exemplary control block in a switch device.
Figure 5C:
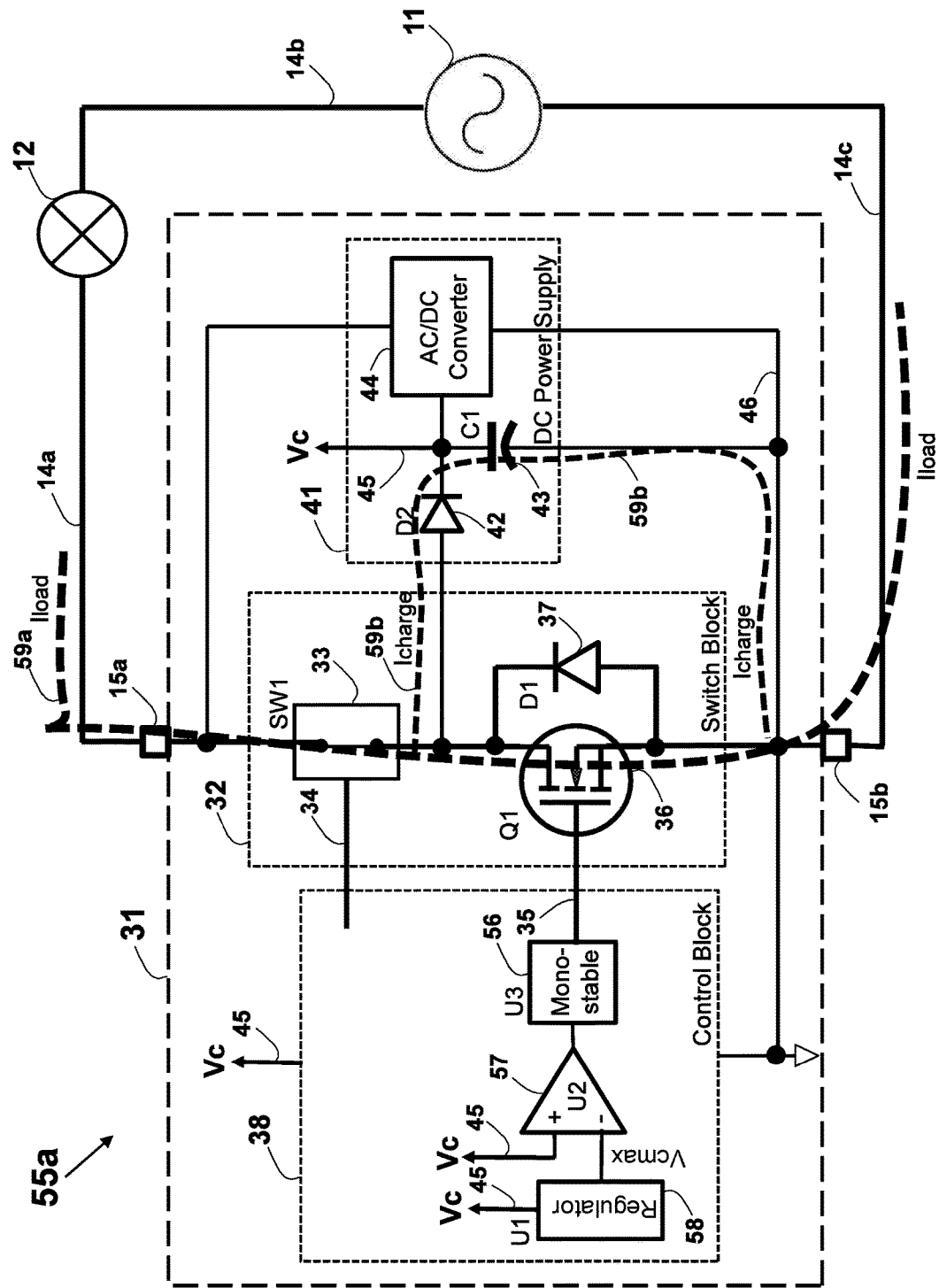
FIG. 5c illustrates schematically the load and charge currents flow in a switch device in a positive half-cycle state.

A schematic diagram 55 in FIG. 5b relates to the switch device 31 operations during the state "SW1 CLOSED—POSITIVE SIDE" 22. The switch SW1 33 is controlled via its control port 34 to be closed, allowing current flow through it. Further, the transistor Q1 36 is controlled via its control port 35 to be conductive, allowing current to flow from the power source 11 to the load 12 via the switch block 32, through the conductive state of the transistor Q1 36 and the closed switch SW1 33. The conductivity of transistor Q1 36 controlled by the control port 35 is determined by closing the loop control in the control block 38, that comprises a regulator U1 58, a comparator U2 57, and a monostable U3 56. The regulator U1 58 output a regulated and stabilized reference voltage level Vcmax, which relates to the maximum value the Vc line 45 voltage is designed to be, such as Vc plus the forward voltage over a diode D2 42. The comparator U2 57 compares the Vcmax from the regulator 58 output to the actual value of the Vc line 45 voltage. In the case the Vc line 45 voltage level is below the maximum value Vcmax, the comparator U2 57 control the monostable U4 56a outputting a control signal over the control line 35, causing the transistor Q1 36 not to be conductive, thus no current flows through the transistor Q1 36 causing the voltage across the transistor Q1 36 (Vds) to follow the AC voltage across the terminals 15a and 15b, and thus charging the capacitor C1 43 via the diode D2 42 until the voltage across it reaches Vcmax. In the case the Vc line 45 voltage level reaches and is above the maximum value Vcmax, the comparator U2 57 activates a monostable for a short time (e.g., 10 milliseconds-10 ms) outputting a control signal over control line 35, causing the transistor Q1 36 to be conduct, lowering the voltage across the transistor Q1 36 (Vds) to be Iload*Rds(on), and disconnecting from the DC power supply circuit 41 by the diode D2 42. The closed control loop causes the capacitor C1 43 to be charged up to around the Vcmax minus the voltage drop across the diode D2 42. While schematic diagram 55 in FIG. 5b shows the switch device 31 during "SW1 OPEN" state 21, FIG. 5c shows a schematic electrical diagram 55a of the current flows that relates to the switch device 31 operations during the state "SW1 CLOSED—POSITIVE SIDE" 22. The Iload 59a dashed line shows the main current flow through the switch block 32 of the switch device 31, from the AC source 11 to the lamp 12. The Icharge 59b dashed line shows the current flow that supplies the Vc line 45 voltage and the charging of the capacitor C1 43, under the control of the closed control loop in the control block 38.

Figure 8:
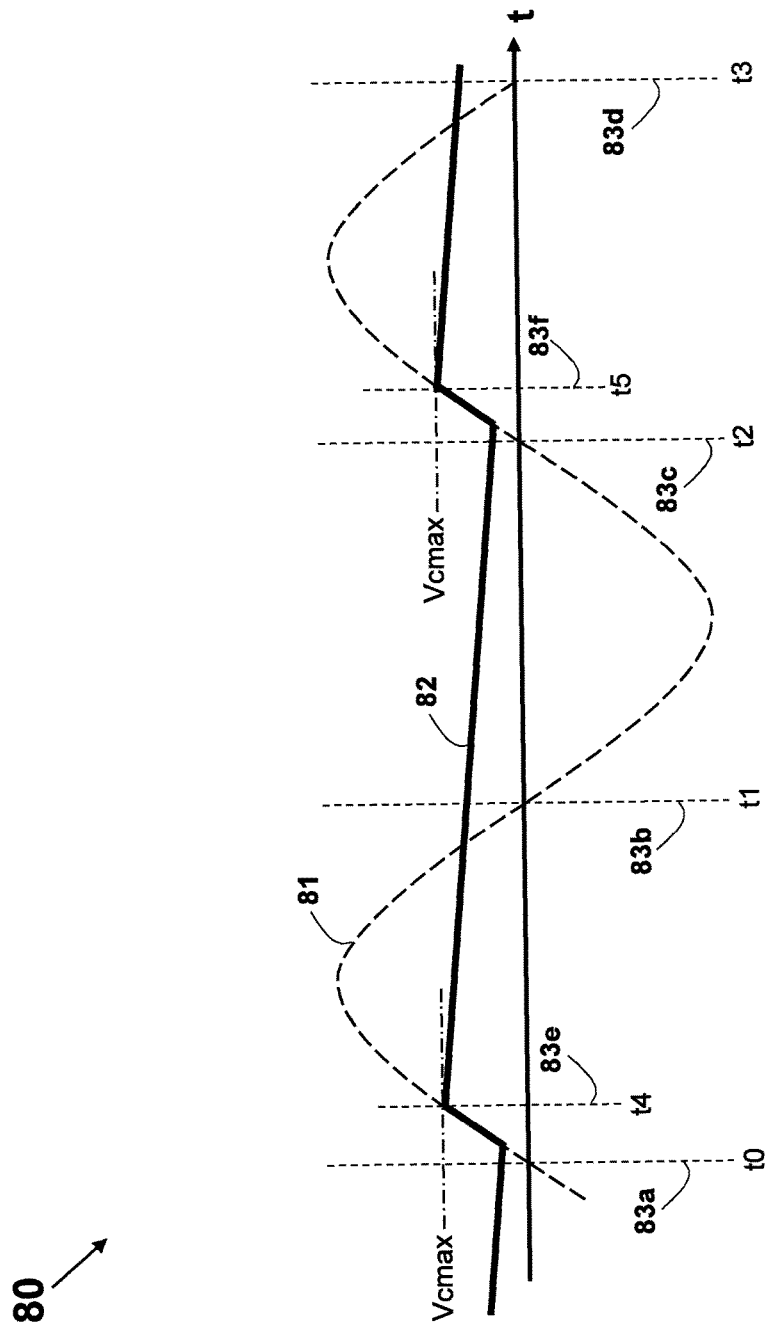
FIG. 8 illustrates a schematic waveform diagram (not scaled) of voltages in a switch device.

In one example, the Capacitor C1 43 is charged for a short time during the start of the positive half-cycle, and store enough energy to DC power the switch 31 electronic circuits during at least one whole cycle, until recharged at the beginning of the next cycle. In such configuration, the monostable may be designed to provide timing of about a full AC power cycle, such as 20 milliseconds in 50 Hz system and 16.6 milliseconds in 60 Hz system. A timing diagram 80 of such configuration is shown in FIG. 8. A graph 81 shows the sinewave waveform of the AC voltage from the AC power source 11, where a positive half-cycle starts at a time t0 83a (known as a zero-cross point), and a negative half-cycle starts at a time t1 83b (another zero-cross point), followed by another cycle including a positive half-cycle that starts at a time t2 83c and a negative half-cycle starts at a time t3 83d. The Vc voltage at line 45 is shown as a graph 82. At the beginning of the positive half-cycle, the voltage Vc is low, as power has been consumed from the capacitor C1 43 over the former cycle. At this point, the control 35 sets the transistor Q1 36 to be non-conductive, hence the voltage upon it (Vds) is raising substantially following the AC voltage shown in the graph 81 (minus the voltage drop on the switch SW1 33 terminals, assumed to be negligible). At a time t4 83e, the voltage Vc reaches Vcmax as detected by the comparator U2 57, and at this point the transistor Q1 36 is controlled to start conducting for a time period determined by the monostable U3 56, and thus the capacitor C1 43 charging is stopped. At this point the voltage Vc reduces with time, as power is consumed from the capacitor C1 43 for power feeding the switch 31 electronic circuits. Preferably, the monostable U3 56 keeps the transistor Q1 36 conductive via the control line 35 until the start of the next positive half-cycle, at time t2 83c, hence the monostable set timing may be higher than a time period calculated as t1-t4, and lower than, or equal to, a time period calculated as t2-t4, to ensure that the switch 31 is at the negative half-cycle at the end of this period. By synchronizing to charge the capacitor C1 43 at times t0 83a and t2 83c that are near or at the sinewave signal zero crossing, when the load power consumption is zero or minimal, there is minimal affect on the load, and for example lamp flickering is avoided.

Figure 6:
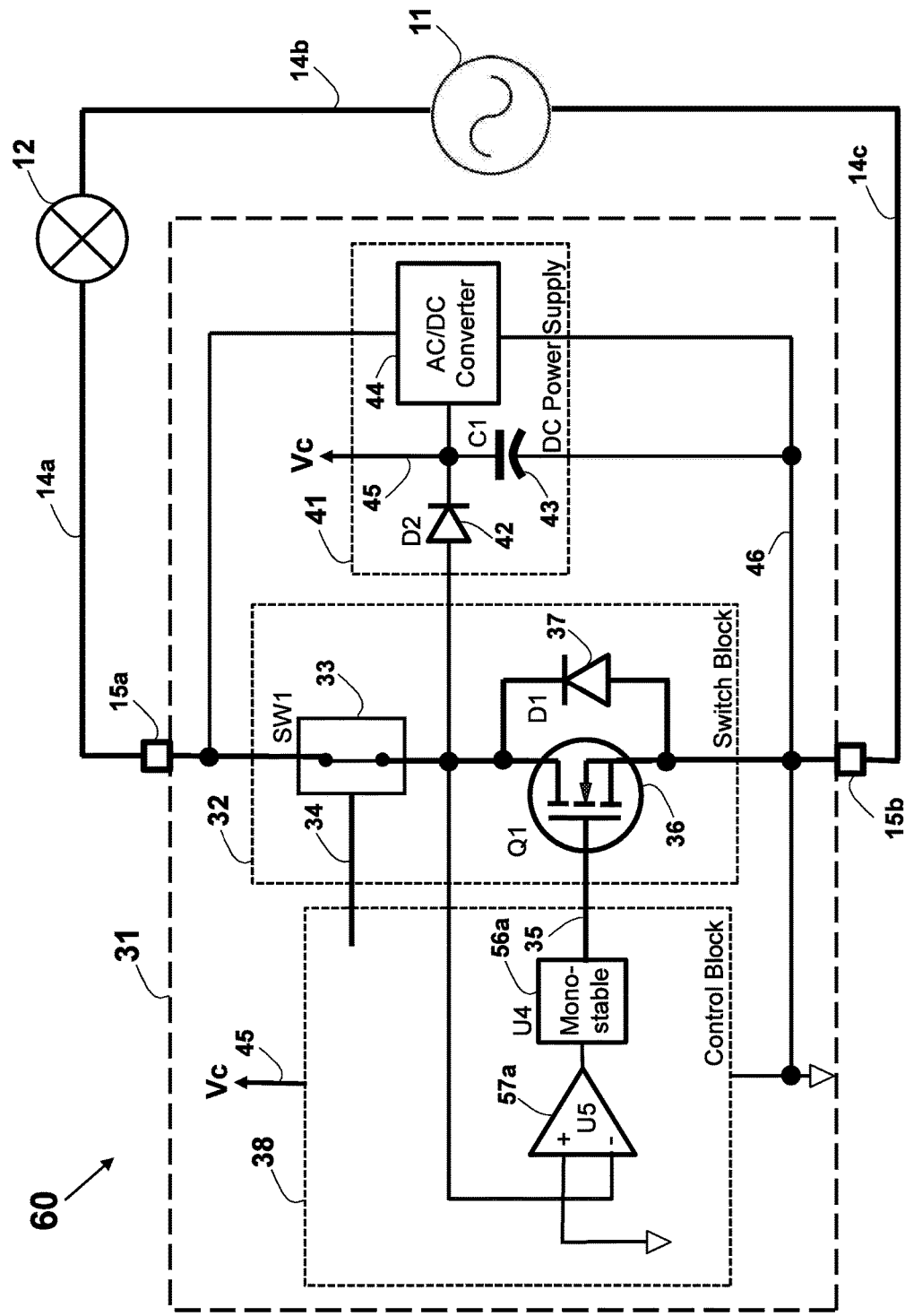
FIG. 6 illustrates a schematic electrical block diagram of part of an exemplary control block in a switch device.
Figure 6A:
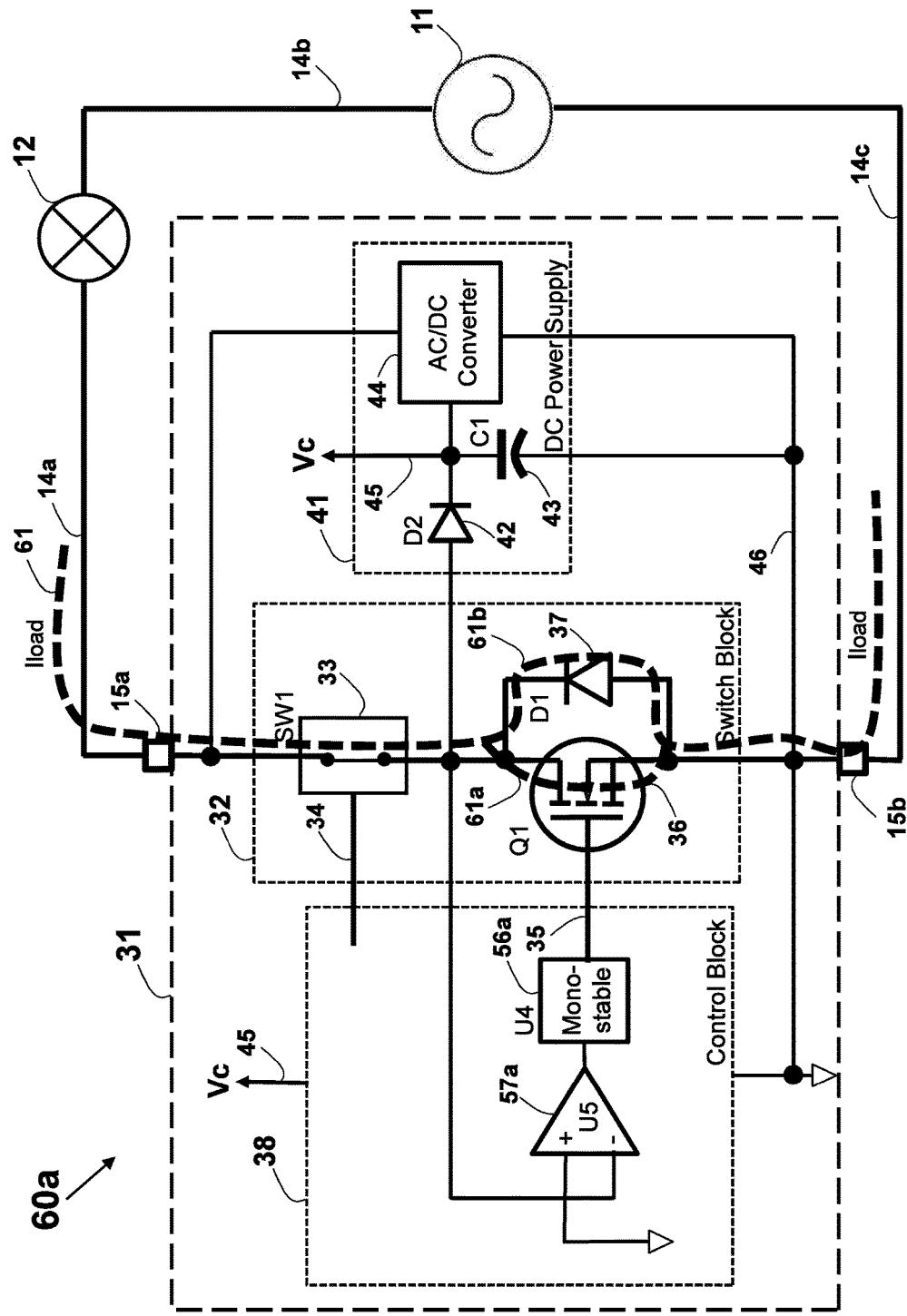
FIG. 6a illustrates schematically the load current flow in a switch device in a negative half-cycle state.

FIGS. 6 and 6a respectively shows schematic electrical diagrams 60 and 60a that relates to the switch device 31 operations during the state "SW1 CLOSED—NEGATIVE SIDE" 23. The switch SW1 33 is controlled via its control port 34 to be closed, allowing current flow through it. The transistor Q1 36 is generally controlled to conduct most of the time, and as shown in FIG. 6a, the load current Iload is flowing via the diode D1 37, as illustrated by an Iload flow dashed line 61b, producing a voltage drop that is the diode forward voltage. Alternatively or in addition, the load current Iload is flowing via the transistor Q1 36 being conductive and thus presenting a low affective resistance Rds(on), as illustrated by an Iload flow dashed line 61a, producing a voltage drop that is Iload*Rds(on). A detection of the cycle status, being shifted to positive or staying in the negative half-cycle may be executed in the control block 38 using a comparator U5 57a and a monostable U4 56a. The comparator U5 57a checks the voltage at the transistor Q1 36 drain terminal. As long as negative voltage is detected (e.g., the forward voltage on the diode D1 37), the monostable is triggering the transistor Q1 36 via its 'gate' line 35 for a short time (such as 400 microseconds) to be non-conductive. Upon detecting a shift to a positive voltage, the switch shifts to the state "SW1 CLOSED—POSITIVE SIDE" 22.

Figure 7:
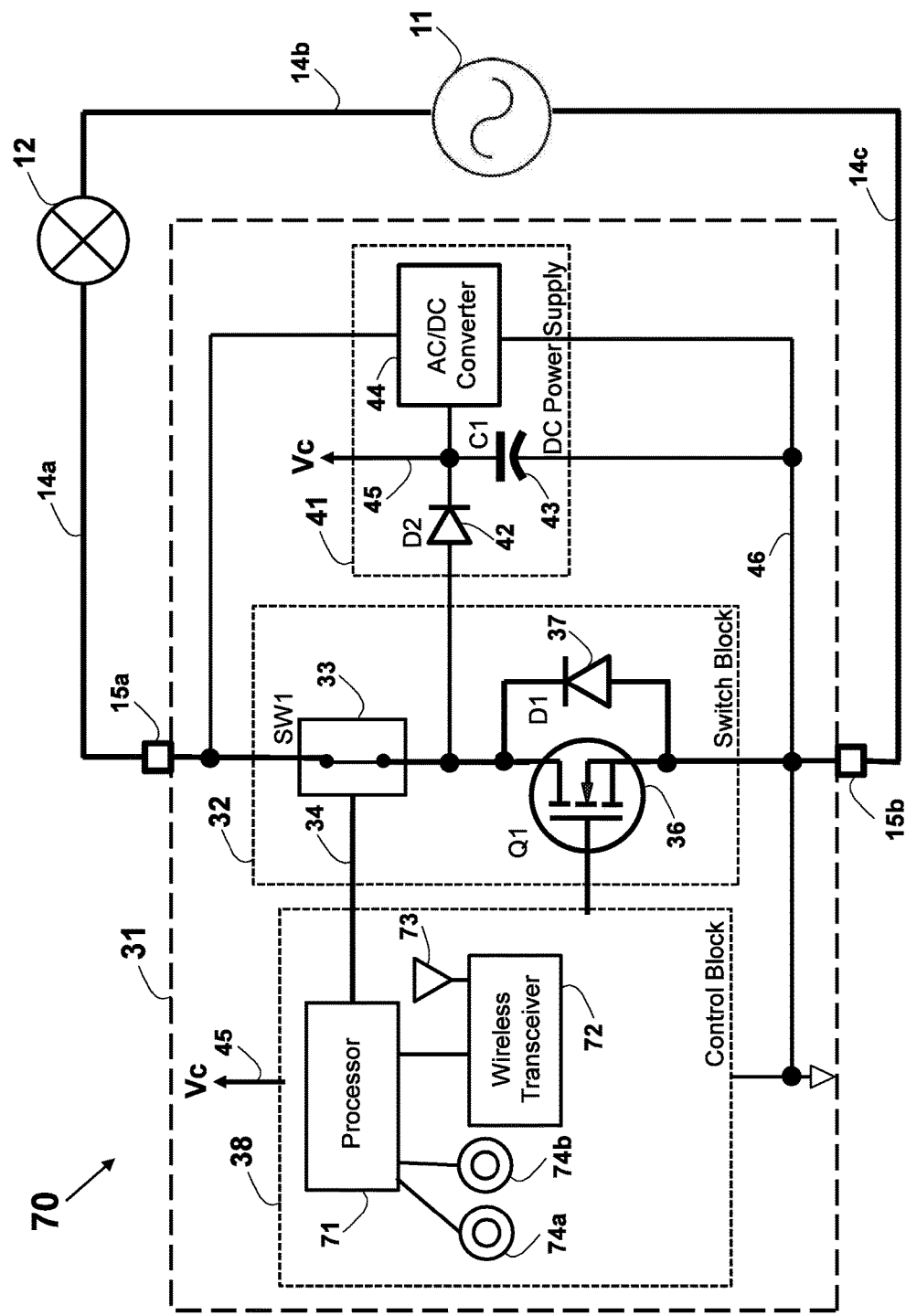
FIG. 7 illustrates a schematic electrical block diagram of part of an exemplary control block in a switch device.

FIG. 7 shows a schematic electrical diagram 70 illustrating the control of the switch SW1 33. The control block 38 comprises a processor 71, coupled to control the switch SW1

33 state via the control line 34. The processor 71 determines when to close the switch SW1 33 hence to shift the switch device 31 to the state "SW1 OPEN" 21 turning the lamp 12 'on', and when to open the switch SW1 33 hence to shift the switch device 31 to one of the states "SW1 CLOSED" 22 or 23.

In one example, the switch device 31 may be locally actuated, for example by a person, using a tactile sensor, being sensitive to force or pressure, or being sensitive to a touch by an object, typically a human touch. For example, two tactile sensors 74a and 74b are shown connected to the processor 71. A tactile sensor is commonly based on piezoresistive, piezoelectric, capacitive, or elastoresistive sensor. Further, a tactile sensor may be based on a conductive rubber, a lead zirconate titanate (PZT) material, a polyvinylidene fluoride (PVDF) material, or a metallic capacitive element. A sensor may include an array of tactile sensor elements, and may provide an 'image' of a contact surface, distribution of pressures, or pattern of forces. A tactile sensor may be a tactile switch where the touch sensing is used to trigger a switch, which may be a capacitance touch switch, where the human body capacitance increases a sensed capacitance, or may be a resistance touch switch, where the human body part such as a finger (or any other conductive object) conductivity is sensed between two conductors (e.g., two pieces of metal). Examples of touch switches are disclosed in PCT International Publication No. WO 2014/076695 to Ziv, entitled: "Modular Touch Switch ", and in PCT International Publication No. WO 2012/083380 to Juhasz et al., entitled: "Touch Switch", which are both incorporated in their entirety for all purposes as if fully set forth herein.

Alternatively or in addition, the switch device 31 may be activated remotely. For example, the control block 38 may comprise a wireless transceiver 72 for non-wired communication over a network (e.g., using an antenna 73), for receiving 'on' and 'off' commands over the air via a network. The network may be any wireless network, and may be a control network (such as ZigBee or Z-Wave), a home network, a WPAN (Wireless Personal Area Network), a WLAN (wireless Local Area Network), a WWAN (Wireless Wide Area Network), or a cellular network.

Similarly, other network may be used to cover another geographical scale or coverage, such as NFC, PAN, LAN, MAN, or WAN type. The network may use any type of modulation, such as Amplitude Modulation (AM), a Frequency Modulation (FM), or a Phase Modulation (PM).

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on wireless technologies that are described in Chapter 20: "*Wireless Technologies*" of the publication number 1-587005-001-3 by Cisco Systems, Inc. (7/99) entitled: "*Internetworking Technologies Handbook*", which is incorporated in its entirety for all purposes as if fully set forth herein.

Alternatively or in addition, the switch device 31 may comprise a motion detector or an occupancy sensor. A motion detector is a device for motion detection, that contains a physical mechanism or electronic sensor that quantifies motion commonly in order alert the user of the presence of a moving object within the field of view, or in general confirming a change in the position of an object relative to its surroundings or the change in the surroundings relative to an object. This detection can be achieved by both mechanical and electronic methods. In addition to discrete, on or off motion detection, it can also consist of magnitude detection that can measure and quantify the strength or speed of this motion or the object that created it. Motion can be typically detected by sound (acoustic sensors), opacity (optical and infrared sensors and video image processors), geomagnetism (magnetic sensors, magnetometers), a reflection of the transmitted energy (infrared laser radar, ultrasonic sensors, and microwave radar sensors), electromagnetic induction (inductive-loop detectors), and vibration (triboelectric, seismic, and inertia-switch sensors). Acoustic sensors are based on: Electret effect, inductive coupling, capacitive coupling, triboelectric effect, piezoelectric effect, and fiber optic transmission. Radar intrusion sensors usually have the lowest rate of false alarms. In one example, an electronic motion detector contains a motion sensor that transforms the detection of motion into an electrical signal. This can be achieved by measuring optical or acoustical changes in the field of view. Most motion detectors can detect up to 15-25 meters (50-80 ft). An occupancy sensor is typically a motion detector that is integrated with hardware or software-based timing device. For example, it can be used for preventing illumination of unoccupied spaces, by sensing when motion has stopped for a specified time period, in order to trigger a light extinguishing signal.

One basic form of mechanical motion detection is in the form of a mechanically-actuated switch or trigger. For electronic motion detection, passive or active sensors may be used, where four types of sensors commonly used in motion detectors spectrum: Passive infrared sensors (passive) which looks for body heat, while no energy is emitted from the sensor, ultrasonic (active) sensors that send out pulses of ultrasonic waves and measures the reflection off a moving object, microwave (active) sensor that sends out microwave pulses and measures the reflection off a moving object, and tomographic detector (active) which senses disturbances to radio waves as they travel through an area surrounded by mesh network nodes. Alternatively or in addition, motion can be electronically identified using optical detection or acoustical detection. Infrared light or laser technology may be used for optical detection. Motion detection devices, such as PIR (Passive Infrared Sensor) motion detectors, have a sensor that detects a disturbance in the infrared spectrum, such as a person or an animal.

Many motion detectors use a combination of different technologies. These dual-technology detectors benefit with each type of sensor, and false alarms are reduced. Placement of the sensors can be strategically mounted so as to lessen the chance of pets activating alarms. Often, PIR technology will be paired with another model to maximize accuracy and reduce energy usage. PIR draws less energy than microwave detection, and so many sensors are calibrated so that when the PIR sensor is tripped, it activates a microwave sensor. If the latter also picks up an intruder, then the alarm is sounded. As interior motion detectors do not 'see' through windows or walls, motion-sensitive outdoor lighting is often recommended to enhance comprehensive efforts to protect a property. Some application for motion detection are (a) detection of unauthorized entry, (b) detection of cessation of occupancy of an area to extinguish lights and (c) detection of a moving object which triggers a camera to record subsequent events.

Figure 1A:
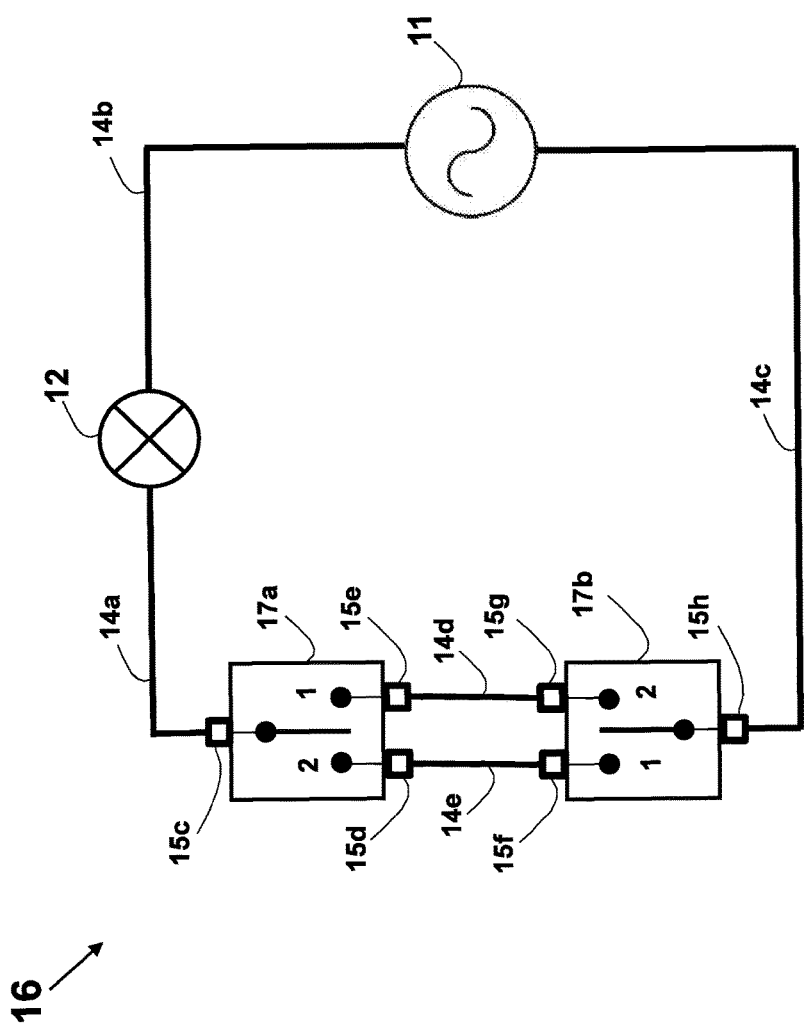
FIG. 1a illustrates a schematic electrical diagram of a prior-art wiring of a multiway switching lighting system in a building.
Figure 2:
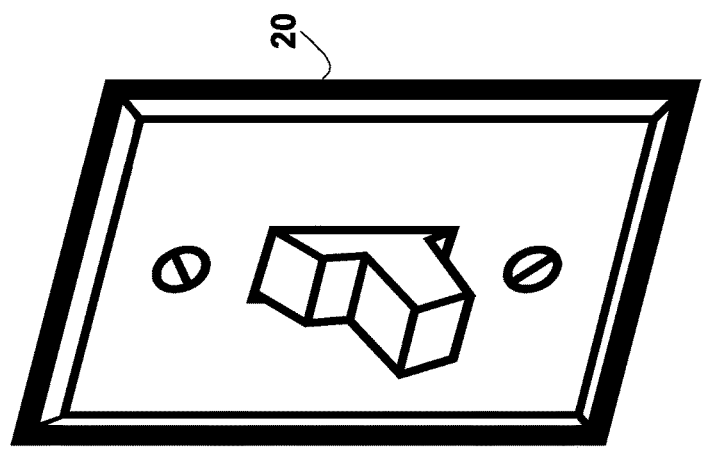
FIG. 2 depicts schematically a light switch.
Figure 9:
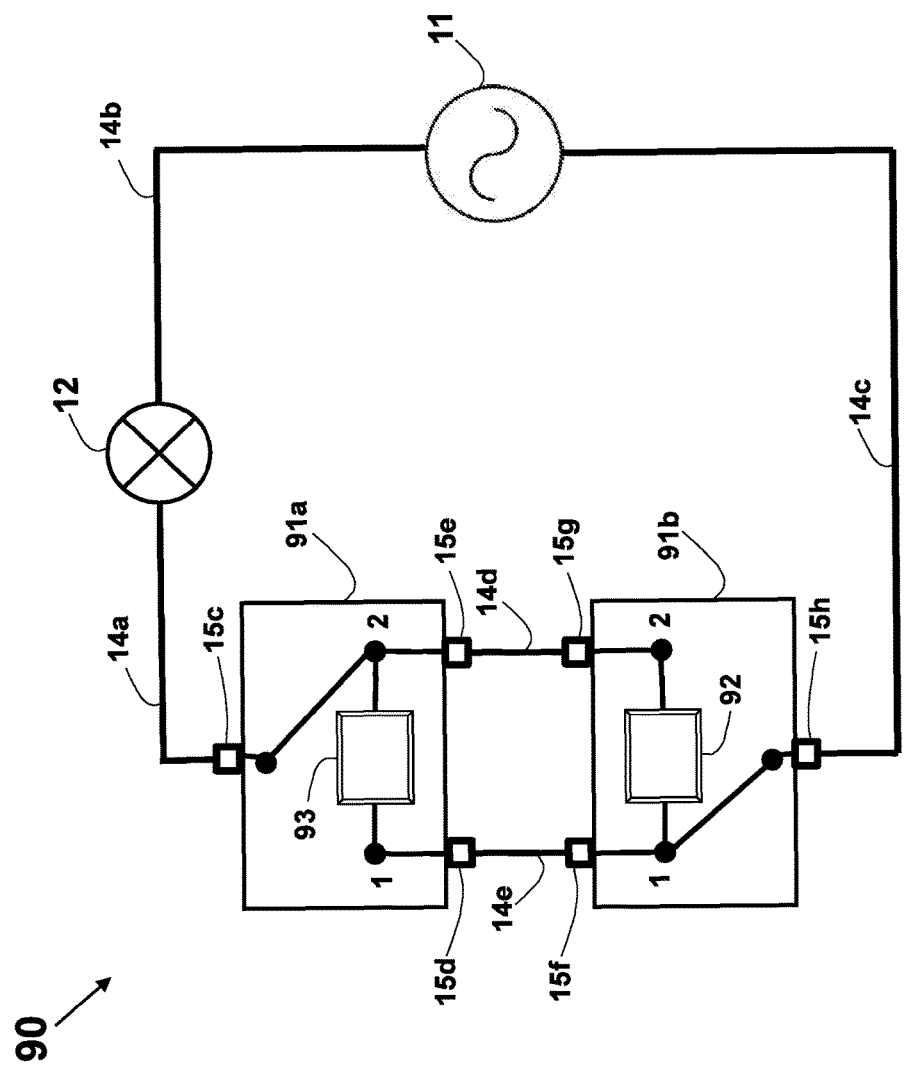
FIG. 9 illustrates a schematic electrical diagram of a wiring of a multiway switching lighting system in a building.
Figure 9A:
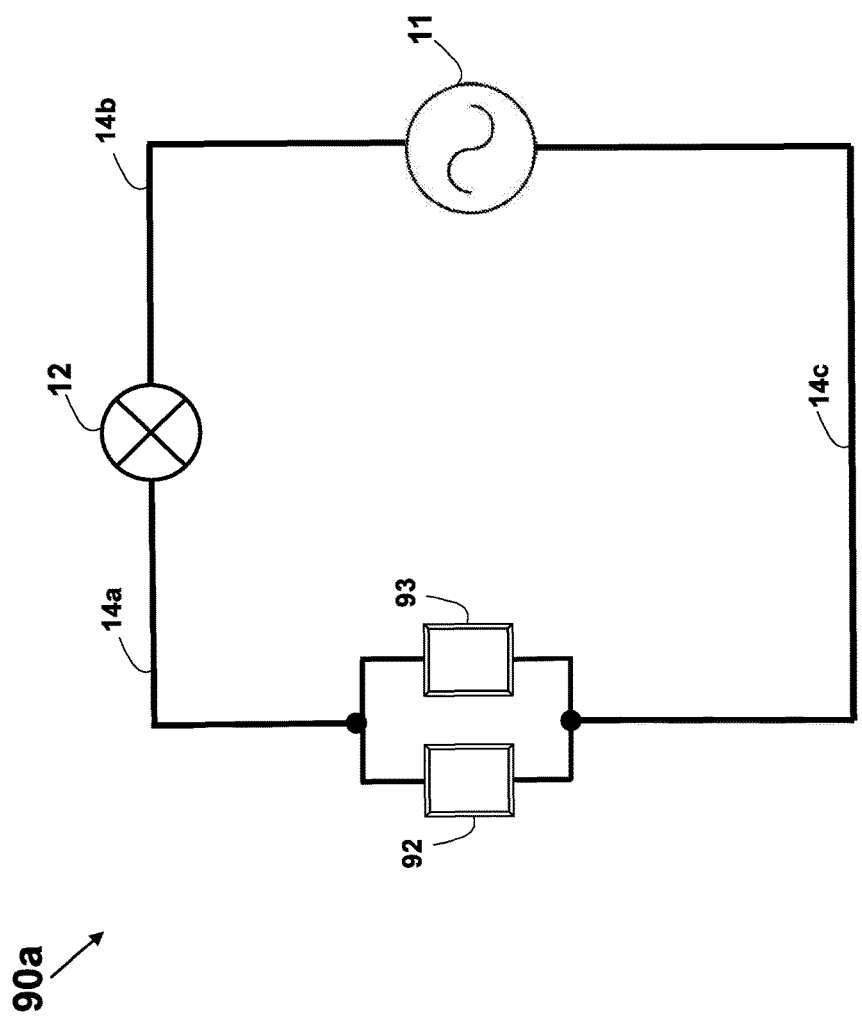
FIG. 9a illustrates a schematic electrical diagram of a multiway switching lighting system in a building.

While exampled above regarding switching the lamp 12 from a single location by a single switch 31 based on the typical arrangement 10 shown in FIG. 1, a multiway switching may equally be used based on the above principles, used in the multiway switching lighting system 16 shown in FIG. 1a. As illustrated in a circuit arrangement 90 shown in FIG. 9, the switches 17a and 17b are substituted with respectively switching assemblies 91a and 91b. The switch assembly 91a includes hard wired connection (non-switched) between the terminal 15c and the terminal 15e (similar to state '2' relating to switch 17a). In addition, a switch device 93 is connected between terminals 15d and 15e. Similarly, the switch assembly 91b includes hard wired connection (non-switched) between the terminal 15h and the terminal 15f (similar to state '1' relating to switch 17b). In addition, a switch device 92 is connected between terminals 15g and 15f. As shown, there is no need for any retrofit or any other modification of the wiring infrastructure, other than replacing the switches 17a and 17b with the respective switching assemblies 91a and 91b. An electrical circuit 90a formed by introducing the two switching assemblies 91a and 91b is shown in FIG. 9a, where the two switch devices 92 and 93 are connected in parallel. In such configuration, by causing any of the switching devices 92 or 93 to be activated (closed), current will flow and will turn the lamp 12 'on'. Only when both switching devices 92 and 93 are open (non-conductive), the lamp 12 will be turned 'off'. The switch device 92 or the switch device 93, or both, may include, may be based on, or may consists of, the switch device 31 described above.

Figure 11:
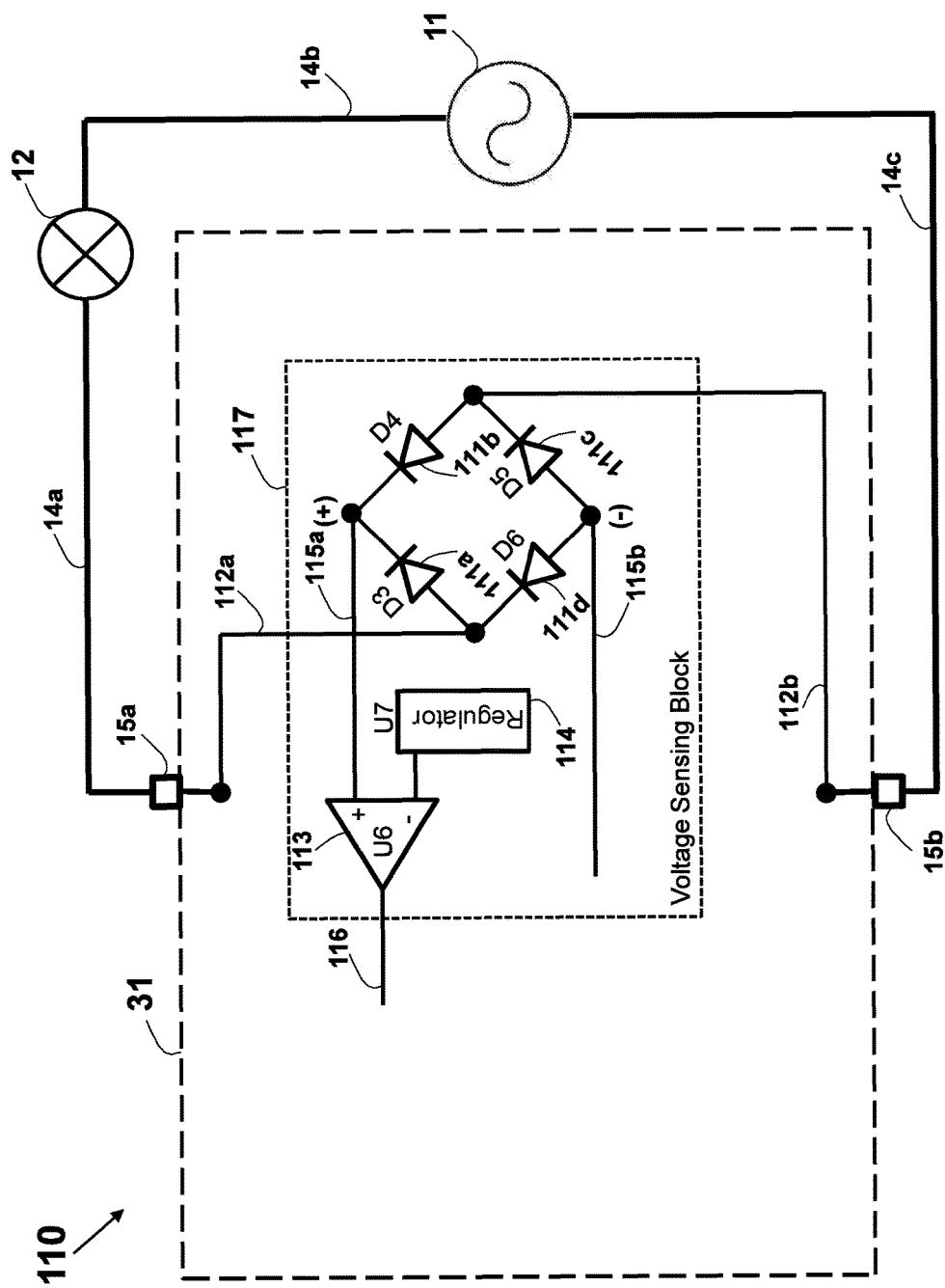
FIG. 11 illustrates a schematic electrical block diagram of part of an exemplary voltage sensing block in a switch device.

In one example, such as in the multiway arrangement shown in FIG. 9a, a switch device 31 may need to detect that it is connected in such arrangement. Such detecting may be based on voltage level sensing, such as by using a voltage sensing block 117 shown in an arrangement 110 in FIG. 11. The voltage sensing block 117 comprises a diode bridge consisting of a diode D3 111a, diode D4 111b, diode D5 111c, and diode D6 111d, connected to be AC power fed as known in the art to the terminal 15a via a line 112a and to the terminal 15b via a line 112b. An output-rectified voltage on lines 115a and 115b is sensed by a comparator U6 113, having an output line 116. The comparator U6 113 compares the rectified voltage to a pre-set voltage set by a regulator U7 114, and indicates when the rectified voltage is above a set threshold determined by the regulator U7 114. In one example, the voltage sensing by the voltage sensing block 117 may be performed periodically (such as every 100 milliseconds) when the switch 31 is in one of the 'SW1 CLOSED' states 22 or 23. The voltage-sensing block 117 may be integrated with the switch device 92, with the switch device 93, or both. In the case the switch 93 is in the 'SW1 OPEN' state 21, the voltage across its terminals is the same, or substantially the same, as the AC source 11 supplied voltage. In the case the switch 93 is in one of the 'SW1 CLOSED' states 22 or 23, the voltage across its terminals is substantially lower, resulting from the voltage drop upon the closed switch SW1 33 (designed to be minimal or negligible), and the voltage drop across transistor Q1 36 'drain' and 'source' terminals, which typically (or never) exceeds the Vcmax voltage level. Assuming the regulator U7 114 output reference voltage is much higher than the Vcmax level, the line 116 output detects wherein a parallel connected switch is in the 'SW1 OPEN' state 21 or one of the 'SW1 CLOSED' states 22 or 23. As such, the switch device 92 may sense the state of a parallel connected switch device 93, and thus may follow its state. In the case the switch device 92 is commanded to one of the 'SW1 CLOSED' state 22 or 23, the lamp 12 will be turned on, regardless of the switch device 93 state. Similarly, in the case the switch device 93 is commanded to one of the 'SW1 CLOSED' state 22 or 23, the lamp 12 will be turned on, regardless of the switch device 92 state. Hence, each of the switch devices 92 or 93, being connected in parallel, may turn the lamp 12 to 'on' state. In the case the switch device 93 shifts to the 'SW1 OPEN' state 21, the higher voltage will be dropped across its terminals, and will be sensed by the voltage sensing block 117 in switch device 92. Upon such sensing, the switch device 92 will follow by shifting to the 'SW1 OPEN' state 21 as well, thus turning the lamp 12 to 'off' state, as both switch devices 92 and 92 are now in the 'SW1 OPEN' state 21.

Figure 10:
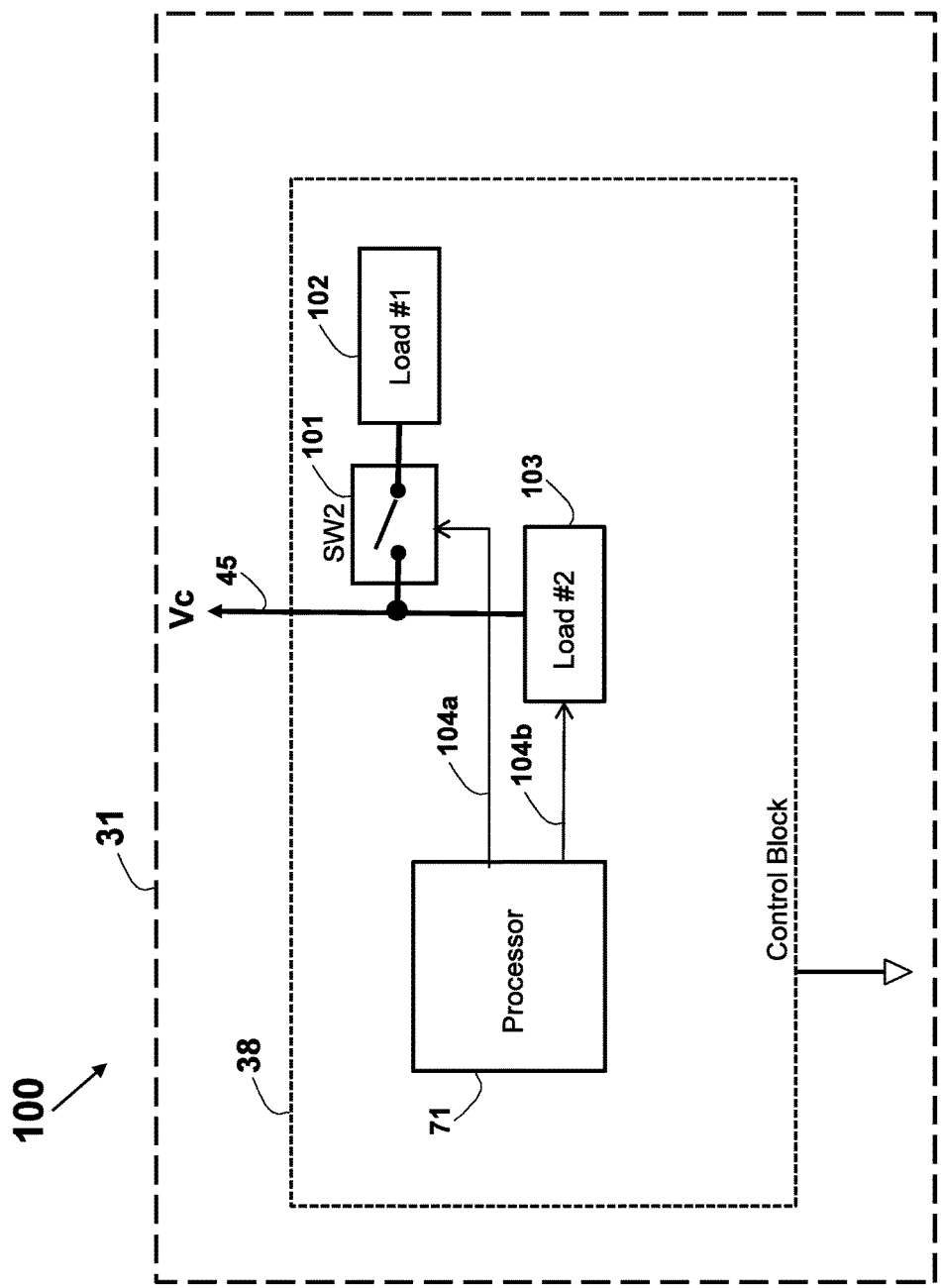
FIG. 10 illustrates a schematic electrical diagram of a powering control of part of a switching device.

In one example, the lamp 12 may be of high resistance and only be consuming a small amount of power. In another example, the electronic circuits of the switch 31 consume a lot of electrical power. In both cases, the above scheme may not provide the needed power for full operation of the switch 31 and all of its internal power consuming components, as may be sensed by measuring the Vc voltage and determining it to be under a pre-set threshold. In this case, the switch 31 may shift to a 'low power' mode, where the power consumption of the internal switch 31 circuits is lowered, aimed to only use the essential circuits and to provide a minimal but essential functionalities. Such a scheme 100 of a switch 31 capable of low power mode is shown in FIG. 10. A load #1 102 represents a non-essential power-consuming circuitry, powered via a switch SW2 101 (which may be similar or of the same type of the switch SW1 33) from the Vc line 45. Upon initiation of a low-power mode, the processor 71 controls the switch SW2 101 via a control line or port 104a to open and thus stops the powering of the load #1 102, hence reducing the total DC power consumed by the switch 31. While exampled above using a single load #1 102, and a single switch SW2 101, it is apparent that multiple loads may be similarly controlled, via one or more switches, having a single or multiple control lines from the processor 71. Similarly, a load such as load #2 103 (or multiple loads) may be directly controlled, such as by a control line 104b, to be non-operative or partially operative, in order to reduce their power consumption. For example, the load #2 103 may be the wireless transceiver 72 controlled by the processor to transmit less RF power for saving power. In another example, the load #1 102 is a light for backlighting the switch 31 panel, which can be dimmed or turned off by the control of the processor 71 in low-power mode.

While exampled above regarding switching power to the lamp 12, any other electrical load may be equally applicable. For example, the load may consists of, or include, an electrical outlet, fans, pumps, heaters, or any other electrically powered home, commercial, or industrial appliance. The home appliance may be major or small appliance, and its main function may be food storage or preparation, cleaning (such as clothes cleaning), or temperature control (environmental, food or water) such as heating or cooling. Examples of appliances are water heaters, HVAC systems, air conditioner, heaters, washing machines, clothes dryers, vacuum cleaner, microwave oven, electric mixers, stoves, ovens, refrigerators, freezers, food processors, dishwashers, food blenders, beverage makers such as coffeemakers and iced-tea makers, answering machines, telephone sets, home cinema systems, HiFi systems, CD and DVD players, induction cookers, electric furnaces, trash compactors, and dehumidifiers. The field unit may consist of, or be integrated with, a battery-operated portable electronic device such as a notebook/laptop computer, a media player (e.g., MP3 based or video player), a cellular phone, a Personal Digital Assistant (PDA), an image processing device (e.g., a digital camera or a video recorder), and/or any other handheld computing devices, or a combination of any of these devices.

The lamp 12 may be any electrical sources of illumination commonly use a gas, a plasma (such as in an arc and fluorescent lamps), an electrical filament, or Solid-State Lighting (SSL), where semiconductors are used. An SSL may be a Light-Emitting Diode (LED), an Organic LED (OLED), or Polymer LED (PLED). Further, an SSL may be a laser diode, which is a laser whose active medium is a semiconductor, commonly based on a diode formed from a p-n junction and powered by the injected electric current. The lamp 12 may be a common light source, sometimes referred to as 'bulb', and may be an arc lamp, a Fluorescent lamp, a gas-discharge lamp, or an incandescent light. An arc lamp (a.k.a. arc light) is the general term for a class of lamps that produce light by an electric arc (also called a voltaic arc). Such a lamp consists of two electrodes, first made from carbon but typically made today of tungsten, which are separated by a gas. The type of lamp is often named by the gas contained in the bulb; including Neon, Argon, Xenon, Krypton, Sodium, metal Halide, and Mercury, or by the type of electrode as in carbon-arc lamps. The common fluorescent lamp may be regarded as a low-pressure mercury arc lamp.

Gas-discharge lamps are a family of artificial light sources that generate light by sending an electrical discharge through an ionized gas (plasma). Typically, such lamps use a noble gas (argon, neon, krypton and xenon) or a mixture of these gases and most lamps are filled with additional materials, like mercury, sodium, and metal halides. In operation the gas is ionized, and free electrons, accelerated by the electrical field in the tube, collide with gas and metal atoms. Some electrons in the atomic orbitals of these atoms are excited by these collisions to a higher energy state. When the excited atom falls back to a lower energy state, it emits a photon of a characteristic energy, resulting in infrared, visible light, or ultraviolet radiation. Some lamps convert the ultraviolet radiation to visible light with a fluorescent coating on the inside of the lamp's glass surface. The fluorescent lamp is perhaps the best known gas-discharge lamp.

A fluorescent lamp (a.k.a. fluorescent tube) is a gas-discharge lamp that uses electricity to excite mercury vapor, and is commonly constructed as a tube coated with phosphor containing low pressure mercury vapor that produces white light. The excited mercury atoms produce short-wave ultraviolet light that then causes a phosphor to fluoresce, producing visible light. A fluorescent lamp converts electrical power into useful light more efficiently than an incandescent lamp. Lower energy cost typically offsets the higher initial cost of the lamp. A neon lamp (a.k.a. Neon glow lamp) is a gas discharge lamp that typically contains neon gas at a low pressure in a glass capsule. Only a thin region adjacent to the electrodes glows in these lamps, which distinguishes them from the much longer and brighter neon tubes used for public signage.

An incandescent light bulb (a.k.a. incandescent lamp or incandescent light globe) produces light by heating a filament wire to a high temperature until it glows. The hot filament is protected from oxidation in the air commonly with a glass enclosure that is filled with inert gas or evacuated. In a halogen lamp, filament evaporation is prevented by a chemical process that redeposits metal vapor onto the filament, extending its life. The light bulb is supplied with electrical current by feed-through terminals or wires embedded in the glass. Most bulbs are used in a socket which provides mechanical support and electrical connections. A halogen lamp (a.k.a. Tungsten halogen lamp or quartz iodine lamp) is an incandescent lamp that has a small amount of a halogen such as iodine or bromine added. The combination of the halogen gas and the tungsten filament produces a halogen cycle chemical reaction which redeposits evaporated tungsten back to the filament, increasing its life and maintaining the clarity of the envelope. Because of this, a halogen lamp can be operated at a higher temperature than a standard gas-filled lamp of similar power and operating life, producing light of a higher luminous efficacy and color temperature. The small size of halogen lamps permits their use in compact optical systems for projectors and illumination.

A Light-Emitting Diode (LED) is a semiconductor light source, based on the principle that when a diode is forward-biased (switched on), electrons are able to recombine with electron holes within the device, releasing energy in the form of photons. This effect is called electroluminescence and the color of the light (corresponding to the energy of the photon) is determined by the energy gap of the semiconductor. Conventional LEDs are made from a variety of inorganic semiconductor materials, such as Aluminium gallium arsenide (AlGaAs), Gallium arsenide phosphide (GaAsP) Aluminium gallium indium phosphide (AlGaInP), Gallium (III) phosphide (GaP), Zinc selenide (ZnSe), Indium gallium nitride (InGaN), and Silicon carbide (SiC) as substrate.

In an Organic Light-Emitting Diodes (OLEDs) the electroluminescent material comprising the emissive layer of the diode, is an organic compound. The organic material is electrically conductive due to the delocalization of pi electrons caused by conjugation over all or part of the molecule, and the material therefore functions as an organic semiconductor. The organic materials can be small organic molecules in a crystalline phase, or polymers. High-power LEDs (HPLED) can be driven at currents from hundreds of mAs to more than an amper, compared with the tens of mAs for other LEDs. Some can emit over a thousand Lumens. Since overheating is destructive, the HPLEDs are commonly mounted on a heat sink to allow for heat dissipation.

LEDs are efficient, and emit more light per watt than incandescent light bulbs. They can emit light of an intended color without using any color filters as traditional lighting methods need. LEDs can be very small (smaller than 2 mm$^2$) and are easily populated onto printed circuit boards. LEDs light up very quickly. A typical red indicator LED will achieve full brightness in under a microsecond. LEDs are ideal for uses subject to frequent on-off cycling, unlike fluorescent lamps that fail faster when cycled often, or HID lamps that require a long time before restarting and can very easily be dimmed either by pulse-width modulation or lowering the forward current. Further, in contrast to most light sources, LEDs radiate very little heat in the form of IR that can cause damage to sensitive objects or fabrics, and typically have a relatively long useful life.

While exampled above regarding switching common dometsic AC power such as 115 VAC or 220 VAC power (to the lamp 12) any other electrical power may be equally switched. For example, lower voltage AC power may be used such as 5 VAC, 12 VAC, and 24 VAC. Similarly, while exampled above regarding switching common domestic AC power using a frequency of 50 or 60 Hz, other electrical power having different frequencies may be equally switched, such as 400 Hz. Further, the system above may be used to switch DC voltages.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refer to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing for the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs. The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any medium or any memory, that participates in providing instructions to a processor, (such as processor 71) for execution, or any mechanism for storing or transmitting information in a form readable by a machine (e.g., a computer). Such a medium may store computer-executable instructions to be executed by a processing element and/or software, and data which is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer which is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment, including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that performs particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A device having two terminals connectable in series to an AC power source and a load for switching an AC power signal from the AC power source to the load, the device comprising in a single enclosure:
    a first terminal for connecting to the AC power source;
    a second terminal for connecting to the load;
    a first electrically controlled switching component comprising a first switch connected between third and fourth terminals that is controlled by a first signal at a fifth terminal;
    a second electrically controlled switching component comprising a second switch connected between sixth and seventh terminals that is controlled by a second signal at an eighth terminal;
    a logic circuit coupled to output the first and second signals respectively to the fifth and eighth terminals; and
    an electrical energy storing component for storing DC power and for powering the logic circuit, the electrical energy storing component is coupled in parallel to the second switch to be charged from the AC power signal,
    wherein the first and second switches are coupled in series to pass the AC power signal between the first and second terminals,
    wherein the device is powered only from the AC power signal,
    wherein the device is configured to be in first and second states, wherein in the first state the first and second switches are controlled by the logic circuit to pass the AC power signal between the first and second terminals to power the load,
    wherein in the second state the first and second switches are controlled by the logic circuit to stop the AC power signal between the first and second terminals,
    wherein as part of the first state the device is configured to further be in third and fourth states,
    and wherein in the third state the component is charged from the AC power signal and in the fourth state the logic circuit is powered by the electrical energy storing component.

2. The device according to claim 1 wherein the logic circuit consists of, or includes, software and a processor for executing the software.

3. The device according to claim 1 wherein the first electrically controlled switching component, or the second electrically controlled switching component, is based on, is part of, or consists of, a relay.

4. The device according to claim 3 wherein the relay is a solenoid-based electromagnetic relay or a reed relay.

5. The device according to claim 3 wherein the relay is a solid-state or semiconductor based relay.

6. The device according to claim 5 wherein the relay is a Solid State Relay (SSR).

7. The device according to claim 1 wherein the first electrically controlled switching component or the electrically controlled switching second component is based on, comprises, or consists of, an electrical circuit that comprises an open collector transistor, an open drain transistor, a thyristor, a TRIAC, or an opto-isolator.

8. The device according to claim 1 wherein the first electrically controlled switching component, or the second electrically controlled switching component, is based on, comprises, or consists of, an electrical circuit or a transistor.

9. The device according to claim 8 wherein the transistor is a field-effect power transistor, wherein the third connection or the sixth connection is a 'drain' pin, the fourth connection or the seventh connection is a 'source' pin, and the fifth terminal or the eighth terminal is a 'gate' pin.

10. The device according to claim 9 wherein the field-effect power transistor is an N-channel or a P-channel field-effect power transistor.

11. The device according to claim 1 further comprising an AC/DC converter connected to be power fed from the first and second terminals, and configured to supply a DC power.

12. The device according to claim 11 further comprising a capacitor or a battery connected to be charged from the DC power.

13. The device according to claim 1 further comprising a tactile sensor coupled to the logic circuit for shifting between the first and second states in response to a human touch or a human mechanical activation.

14. The device according to claim 1 further operative to shifting between the first and second states in response to a remote command.

15. The device according to claim 14 further comprising an antenna for receiving signals over the air, and a wireless transceiver coupled to the antenna to receive the remote command from a wireless network, wherein the logic circuits coupled to the wireless transceiver to receive the remote command therefrom.

16. The device according to claim 15 wherein the wireless network is a Wireless Personal Area Network (WPAN), the wireless transceiver is a WPAN transceiver, and the antenna is a WPAN antenna.

17. The device according to claim 16 wherein the WPAN is according to, or based on, IEEE 802.15.1-2005 standard, or wherein the WPAN is a wireless control network that is according to, or based on, IEEE 802.15.4-2003, standard.

18. The device according to claim 15 wherein the wireless network is a Wireless Local Area Network (WLAN), the wireless transceiver is a WLAN transceiver, and the antenna is a WLAN antenna.

19. The device according to claim 18 wherein the WLAN is according to, or base on, IEEE 802.11-2012, IEEE 802.11a, IEEE 802.11b, IEEE 802.11g, IEEE 802.11n, or IEEE 802.11ac.

20. The device according to claim 15 wherein the wireless network is over an unlicensed radio frequency band.

21. The device according to claim 20 wherein the unlicensed radio frequency band is an Industrial, Scientific and Medical (ISM) radio band.

22. The device according to claim 15 wherein the wireless network is a Wireless Wide Area Network (WWAN), the wireless transceiver is a WWAN transceiver, and the antenna is a WWAN antenna.

23. The device according to claim 22, wherein the WWAN is a WiMAX network, wherein the antenna is a WiMAX antenna and the wireless transceiver is a WiMAX modem, and the WiMAX network is according to, or based on, IEEE 802.16-2009.

24. The device according to claim 22, wherein the WWAN is a cellular telephone network, the antenna is a cellular antenna, and the wireless transceiver is a cellular modem.

25. The device according to claim 24 wherein the cellular telephone network is a Third Generation (3G) network that uses UMTS W-CDMA, UMTS HSPA, UMTS TDD, CDMA2000 1xRTT, CDMA2000 EV-DO, or GSM EDGE-Evolution, or wherein the cellular telephone network is a Fourth Generation (4G) network that uses HSPA+, Mobile WiMAX, LTE, LTE-Advanced, MBWA, or is based on IEEE 802.20-2008.

26. The device according to claim 1 further configured to substitute a light switch.

27. The device according to claim 26 wherein the single enclosure is dimensioned and shaped to be installed in a light switch outlet cavity.

28. The device according to claim 1 wherein the AC power is a domestic mains.

29. The device according to claim 28 wherein the AC power is nominally 120 VAC/60 Hz or 230 VAC/50 Hz.

30. The device according to claim 28 wherein the load is a light source.

31. The device according to claim 30 wherein the light source light source is an electric light source for converting electrical energy into light.

32. The device according to claim 31 wherein the electric light source emits visible or non-visible light for illumination or indication, the non-visible light is infrared, ultraviolet, X-rays, or gamma rays.

33. The device according to claim 32 wherein the electric light source consists of, or comprises, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

34. A system for switching AC power from the AC power source to the load, the system comprising:
the load; and
the device according to claim 1,
wherein the device is connected in series between the AC power source and the load for switching the AC power from the AC power source to the load.

35. The device according to claim 1, wherein the electrical energy-storing component consists of, or comprises, a rechargeable battery or a capacitor.

36. The device according to claim 1, further comprising a voltage detector responsive to the detected voltage across the first and second terminals, across the second switch, or across the electrical energy storing component, and wherein the device is configured to be in the third state when the detected voltage is positive.

37. The device according to claim 36, for use with a voltage threshold, wherein the device is configured to be in the third state when the detected voltage is below the voltage threshold.

* * * * *